US011481551B2

(12) United States Patent
Song et al.

(10) Patent No.: US 11,481,551 B2
(45) Date of Patent: *Oct. 25, 2022

(54) DEVICE AND METHOD FOR PROVIDING RECOMMENDED WORDS FOR CHARACTER INPUT

(71) Applicant: SAMSUNG ELECTRONICS CO., LTD., Suwon-si (KR)

(72) Inventors: Hee-jun Song, Seoul (KR); Jung-wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

This patent is subject to a terminal disclaimer.

(21) Appl. No.: 16/724,641

(22) Filed: Dec. 23, 2019

(65) Prior Publication Data

US 2020/0125797 A1 Apr. 23, 2020

Related U.S. Application Data

(63) Continuation of application No. 15/789,106, filed on Oct. 20, 2017, now Pat. No. 10,540,441.

(Continued)

(30) Foreign Application Priority Data

Dec. 23, 2016 (KR) ........................ 10-2016-0177389
Aug. 30, 2017 (KR) ........................ 10-2017-0110349

(51) Int. Cl.
*G06F 40/274* (2020.01)
*G06F 40/163* (2020.01)
(Continued)

(52) U.S. Cl.
CPC .......... *G06F 40/274* (2020.01); *G06F 40/163* (2020.01); *G06F 40/268* (2020.01); *G06F 40/279* (2020.01)

(58) Field of Classification Search
USPC ...................................... 704/7–10, 257, 261
See application file for complete search history.

(56) References Cited

U.S. PATENT DOCUMENTS 7,177,797 B1 2/2007 Micher
7,194,404 B1 3/2007 Babst
(Continued)

FOREIGN PATENT DOCUMENTS

EP 2 592 566 A1 5/2013
EP 1 726 169 10/2014
(Continued)

OTHER PUBLICATIONS

U.S. Appl. No. 15/789,106, filed Oct. 20, 2017; Song et al.
(Continued)

*Primary Examiner* — Leonard Saint Cyr
(74) *Attorney, Agent, or Firm* — Nixon & Vanderhye P.C.

(57) ABSTRACT

A device and method for providing recommended words for a character input by a user are provided. The method by which the device provides recommended words includes: receiving an input for inputting a character in a character input window; recommending at least one pseudo-morpheme including the input character by analyzing the input character; recommending at least one extended word including a selected pseudo-morpheme in response to receiving an input for selecting one of the at least one pseudo-morpheme; and displaying a selected extended word in response to receiving an input for selecting one of the at least one extended word.

20 Claims, 25 Drawing Sheets

Related U.S. Application Data

(60) Provisional application No. 62/411,056, filed on Oct. 21, 2016.

(51) Int. Cl.
*G06F 40/268* (2020.01)
*G06F 40/279* (2020.01)

(56) References Cited

U.S. PATENT DOCUMENTS

| | | | |
|---|---|---|---|
| 10,168,800 B2 | 1/2019 | Kim et al. | |
| 2005/0208952 A1 | 9/2005 | Dietrich et al. | |
| 2006/0265648 A1 | 11/2006 | Rainisto et al. | |
| 2008/0215550 A1 | 9/2008 | Fume | |
| 2011/0071818 A1 | 3/2011 | Jiang | |
| 2011/0286437 A1 | 11/2011 | Austin et al. | |
| 2011/0306354 A1 | 12/2011 | Ledlie et al. | |
| 2012/0326984 A1* | 12/2012 | Ghassabian | G06F 3/04883 345/168 |
| 2013/0159337 A1 | 6/2013 | Lee et al. | |
| 2013/0246329 A1 | 9/2013 | Pasquero et al. | |
| 2013/0283337 A1* | 10/2013 | Schechter | G06F 21/46 726/1 |
| 2013/0321239 A1 | 12/2013 | Bingham | |
| 2014/0051357 A1 | 2/2014 | Steer et al. | |
| 2014/0123050 A1 | 5/2014 | Danielsson et al. | |
| 2014/0278368 A1 | 9/2014 | Skory | |
| 2015/0149896 A1* | 5/2015 | Radhakrishnan | G06F 40/242 715/271 |
| 2015/0293602 A1 | 10/2015 | Kay et al. | |
| 2015/0296074 A1 | 10/2015 | Shah et al. | |
| 2016/0041965 A1* | 2/2016 | Ghassabian | G06F 3/04886 715/261 |
| 2016/0171974 A1 | 6/2016 | Hannun et al. | |
| 2017/0228123 A1* | 8/2017 | Ghassabian | G06F 3/0236 |
| 2018/0081964 A1* | 3/2018 | Su | G06F 16/3331 |
| 2022/0044690 A1 | 2/2022 | Lee et al. | |

FOREIGN PATENT DOCUMENTS

| | | |
|---|---|---|
| EP | 3 080 714 | 10/2016 |
| KR | 10-0838818 | 6/2008 |
| KR | 10-2012-0006503 | 1/2012 |
| KR | 10-2016-0055162 A | 5/2016 |
| KR | 10-2016-0105688 A | 9/2016 |
| WO | 2011/070551 | 6/2011 |
| WO | 2012/114161 | 8/2012 |
| WO | WO 2015/087075 | 6/2015 |

OTHER PUBLICATIONS

U.S. Appl. No. 62/411,056, filed Oct. 21, 2016; Song et al.

Extended European Search Report dated Jun. 18, 2019 for EP Application No. 17862947.3.

Extended Search Report dated Feb. 2, 2018 in counterpart European Patent Application No. 17187796.2.

Bahl, P. et al., "Radar: An In-building RF-based User Location and Tracking System," INFOCOM 2000. Nineteenth Annual Joint Conference of the IEEE Computer and Communications Societies. IEEE vol. 2, Mar. 26, 2000, pp. 775-784, XP010376167, ISBN: 978-0-7803-5880-5.

India Office Action dated Apr. 21, 2021 for IN Application No. 201927016331.

Korean Office Action dated Sep. 17, 2021 for KR Application No. 10-2017-0110349.

EP Written Summons dated Mar. 4, 2022 for EP Application No. 17862947.3.

KR Notice of Allowance dated Mar. 30, 2022 for KR Application 10-2017-0110349.

* cited by examiner

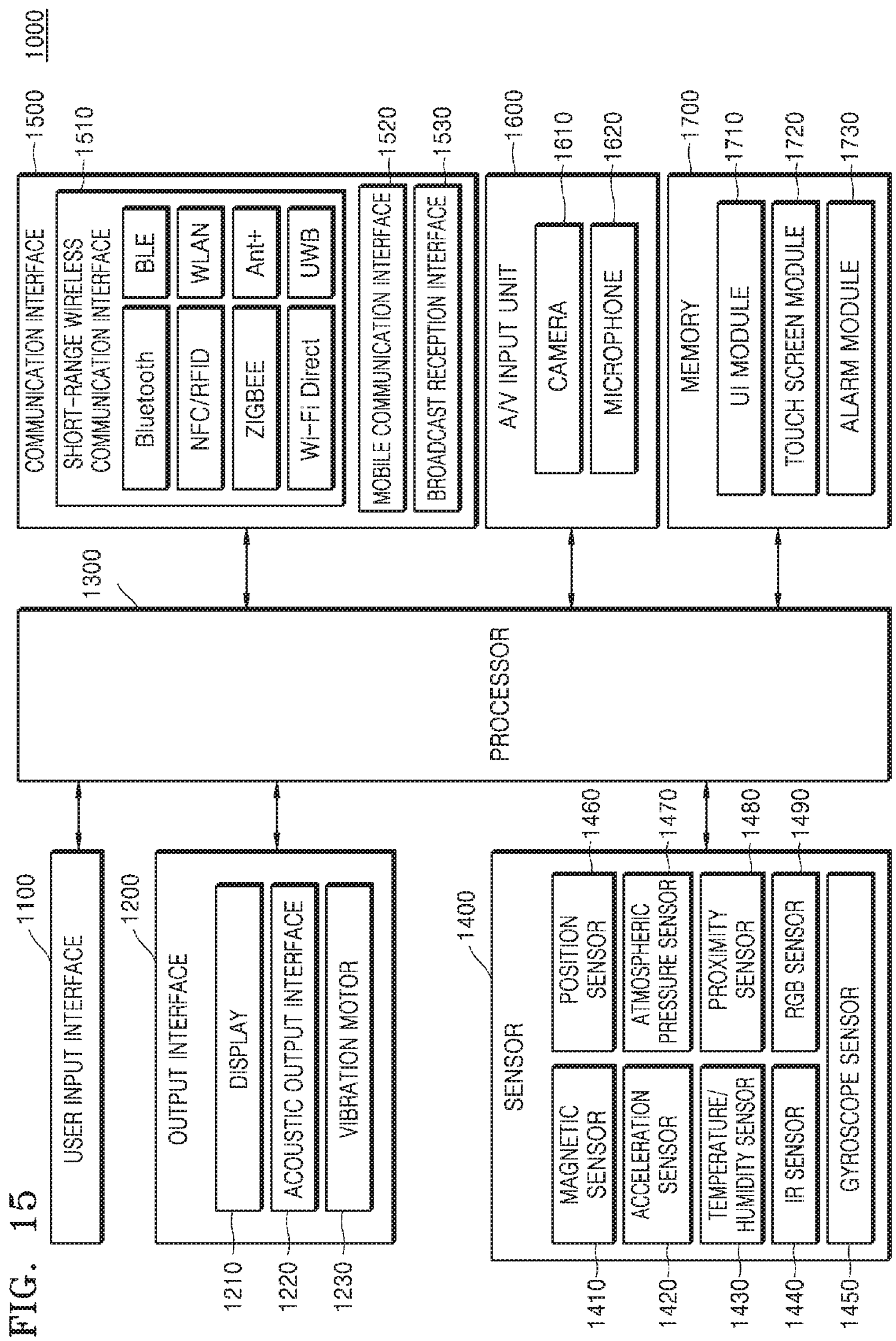
FIG. 15
1000
COMMUNICATION INTERFACE
1500
SHORT-RANGE WIRELESS COMMUNICATION INTERFACE
1510
Bluetooth
BLE
NFC/RFID
WLAN
ZIGBEE
Ant+
Wi-Fi Direct
UWB
MOBILE COMMUNICATION INTERFACE
1520
BROADCAST RECEPTION INTERFACE
1530
A/V INPUT UNIT
1600
CAMERA
1610
MICROPHONE
1620
MEMORY
1700
UI MODULE
1710
TOUCH SCREEN MODULE
1720
ALARM MODULE
1730
PROCESSOR
1300
USER INPUT INTERFACE
1100
OUTPUT INTERFACE
1200
DISPLAY
1210
ACOUSTIC OUTPUT INTERFACE
1220
VIBRATION MOTOR
1230
SENSOR
1400
MAGNETIC SENSOR
1410
POSITION SENSOR
1460
ACCELERATION SENSOR
1420
ATMOSPHERIC PRESSURE SENSOR
1470
TEMPERATURE/ HUMIDITY SENSOR
1430
PROXIMITY SENSOR
1480
IR SENSOR
1440
RGB SENSOR
1490
GYROSCOPE SENSOR
1450

DEVICE AND METHOD FOR PROVIDING RECOMMENDED WORDS FOR CHARACTER INPUT

CROSS-REFERENCE TO RELATED APPLICATIONS

This application is a Continuation of and claims priority to U.S. application Ser. No. 15/789,106, filed Oct. 20, 2017, which claims priority to U.S. Provisional Application No. 62/411,056, filed on Oct. 21, 2016 and Korean Patent Application No. 10-2016-0177389, filed on Dec. 23, 2016, and Korean Patent Application No. 10-2017-0110349, filed on Aug. 30, 2017, the disclosures of which are all incorporated by reference herein in their entireties.

BACKGROUND

1. Field

The present disclosure relates generally to a device and method for providing recommended words, and for example, to a device and method for providing recommended words for a character input, for example, by a user.

2. Description of Related Art

Along with the development of multimedia technology and network technology, users may receive various services using devices. Particularly, various methods of providing recommended words based on a word being input by a user have been provided. However, there have been problems in that an amount of data to be stored in a database is large and it is difficult to accurately recommend a word intended by a user. Therefore, a method capable of accurately predicting and recommending a word intended by a user is required.

In addition, recently, artificial intelligence systems implementing the intelligence of a human level have been used in various fields. Unlike the existing rule-based smart systems, the artificial intelligence systems are systems in which machines are getting smarter through self-learning and self-determination. The more an artificial intelligence system is used, the more a recognition rate is improved, and the more accurately a user's taste is understandable, and thus the existing rule-based smart systems have been gradually replaced with deep-learning-based artificial intelligence systems.

Artificial intelligence technology includes machine learning (for example, deep learning) and element technologies using the machine learning.

The machine learning is an algorithm technology of classifying/learning characteristics of pieces of input data without any help from the outside, and the element technologies simulate functions such as recognition and determination of human brain using machine learning algorithms such as deep learning and include technical fields such as linguistic understanding, visual understanding, inference/prediction, knowledge expression, and motion control.

Various fields to which artificial intelligence technology is applied include the following. The linguistic understanding is a technology of recognizing and applying/processing language/characters of a human being and includes natural language processing, machine translation, dialog system, question and answer, voice recognition/synthesis, and the like. The visual understanding is a technology of recognizing and processing an object like vision of a human being and includes object recognition, object tracking, image search, person recognition, scene understanding, space understanding, image enhancement, and the like. The inference/prediction is a technology of determining information to logically derive inference and prediction and includes knowledge/probability-based inference, optimization prediction, preference-based planning, recommendation, and the like. The knowledge expression is a technology of automatically processing experience information of a human being to knowledge data and includes knowledge construction (data generation/classification), knowledge management (data utilization), and the like. The motion control is a technology of controlling autonomous driving of a vehicle and a motion of a robot and includes motion control (navigation, collision, driving), operation control (behavior control), and the like.

SUMMARY

A device and method for providing recommended words, so as to reduce an amount of data to be stored in a database, by providing recommended words in units of pseudo-morphemes including a character input by a user are provided.

A device and method for effectively providing recommended words in accordance with an intention of a user by providing recommended words in pseudo-morpheme units each being smaller than an extended word and providing recommended words in units of extended words based on a pseudo-morpheme selected from among recommended pseudo-morphemes are provided.

Additional aspects will be set forth in part in the description which follows and, in part, will be apparent from the description.

According to an aspect of an example embodiment, a device includes: a memory configured to store at least one program; an input interface comprising circuitry configured to receive a character input in a character input window; and at least one processor configured to provide recommended words for the input character by executing the at least one program, wherein the at least one program includes at least one instruction, which when executed, cause the processor to: recommend at least one pseudo-morpheme including the input character by analyzing the input character; recommend at least one extended word including a selected pseudo-morpheme in response to an input selecting one of the at least one pseudo-morpheme; and display a selected extended word in the character input window in response to an input selecting one of the at least one extended word.

According to an aspect of another example embodiment, a method by which a device provides recommended words for a character input from a user includes: receiving a character input in a character input window; recommending at least one pseudo-morpheme including the input character by analyzing the input character; recommending at least one extended word including a selected pseudo-morpheme in response to an input selecting one of the at least one pseudo-morpheme; and displaying a selected extended word in response to an input selecting one of the at least one extended word.

According to an aspect of another example embodiment, a computer program product includes a non-transitory computer-readable recording medium including at least one instruction set which, when executed by a processor, causes the device to: recommend at least one pseudo-morpheme including an input character input in a character input window by analyzing the input character; recommending at least one extended word including a selected pseudo-morpheme in response to an input selecting one of the at least one pseudo-morpheme; and displaying a selected extended word in response to an input selecting one of the at least one extended word.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 15 is a block diagram illustrating an example device according to other example embodiments;

DETAILED DESCRIPTION

Figure 1:
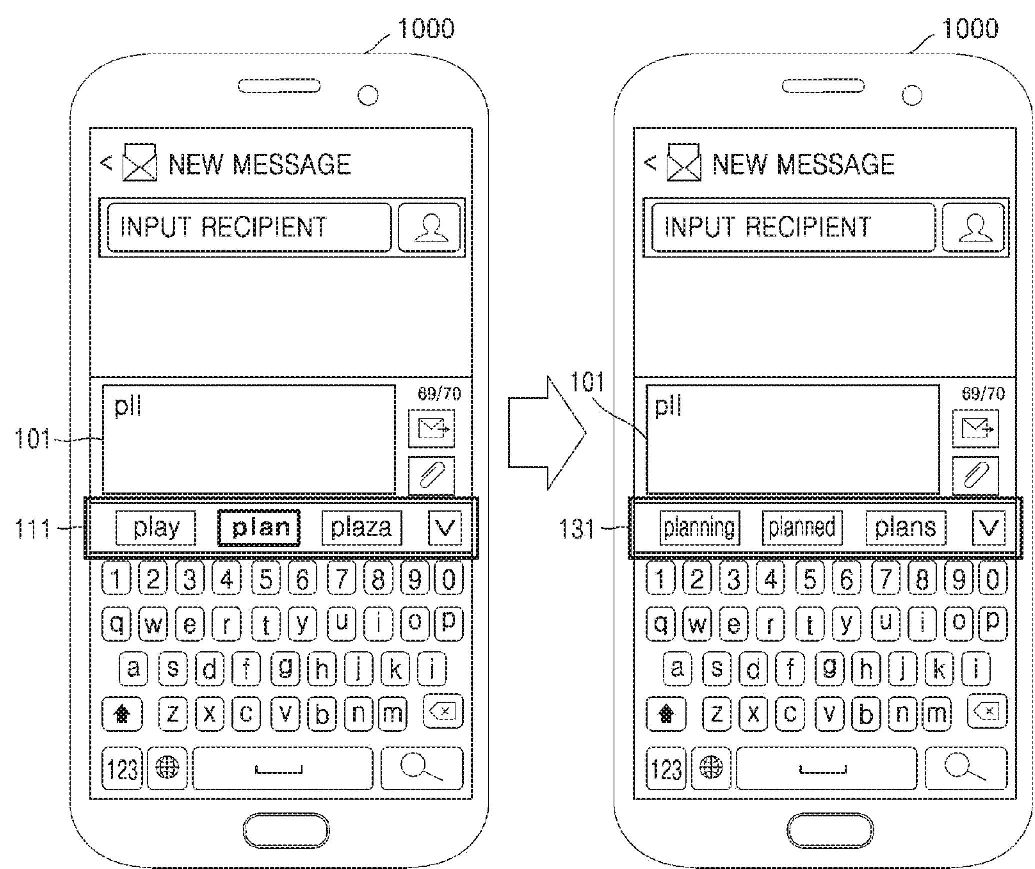
FIG. 1 is a diagram illustrating an example in which a device provides recommended words for a character input by a user, according to various example embodiments.

Reference will now be made in greater detail to various example embodiments, examples of which are illustrated in the accompanying drawings. In the drawings, parts irrelevant to the description may be omitted to clearly describe the example embodiments, and like reference numerals refer to like elements throughout the disclosure. In this regard, the present embodiments may have different forms and should not be construed as being limited to the descriptions set forth herein. Accordingly, the embodiments are merely described below, by referring to the figures, to explain various example aspects.

Throughout the disclosure, when it is described that a certain part is 'connected' to another part, it should be understood that the certain part may be "directly connected" to another part or "electrically connected" via another element in between. In addition, when a certain part "includes" a certain component, this indicates that the part may further include another component instead of excluding another component unless there is different disclosure.

As used herein, the term "and/or" includes any and all combinations of one or more of the associated listed items. Expressions such as "at least one of," when preceding a list of elements, modify the entire list of elements and do not modify the individual elements of the list.

A pseudo-morpheme may refer, for example, and without limitation, to a smallest unit of language having meaning. For example, a pseudo-morpheme may include the minimum unit of noun having meaning, and according to various example embodiments, a compound noun having meaning may also be classified into one pseudo-morpheme. For example, "play", "plastic", and "plaza" are nouns having different meanings, and thus each of "play", "plastic", and "plaza" may be one pseudo-morpheme. In addition, the pseudo-morpheme may include, for example, and without limitation, an infinitive form of a verb, In addition, a word may be used as meaning including a pseudo-morpheme and an extended word.

An extended word may include, for example, and without limitation, a word derived from a pseudo-morpheme and may indicate a component that is a unit of space. For example, an extended word may include another word added to one pseudo-morpheme or a suffix added to one pseudo-morpheme.

In the case of English, each word may, for example, and without limitation, refer to a unit of space, and an extended word may indicate, for example, and without limitation, one word derived from a pseudo-morpheme. For example, an extended word may have a form in which a suffix (for example, a past tense, a past participle tense, or a present progressive tense) is added to a bare infinitive that is a pseudo-morpheme, a form in which a suffix (for example, "-ly" or "-ness") is added to an adjective that is a pseudo-morpheme, and a form in which a suffix (for example, “less”) is added to a noun that is a pseudo-morpheme, but is not limited thereto.

Unlike English, in Korean, an extended word may, for example, and without limitation indicate Eojeol. Eojeol may indicate each constituent of one sentence and may be a unit of space. In Korean, one Eojeol may have a form in which two or more words are combined. For example, in Korean, one noun (for example, “sarang” corresponding to English “love”) and one postposition (for example, “eun” corresponding to English “is”) may be combined to form one Eojeol (for example, “sarang-eun” corresponding to English “love is”).

Hereinafter, the present disclosure is described in greater detail with reference to the accompanying drawings.

FIG. 1 is a diagram illustrating an example in which a device 1000 provides recommended words for a character input, for example, by a user, according to various example embodiments.

Referring to FIG. 1, the device 1000 may receive an input for inputting a character in a character input window 101 and provide recommended words based on the input character.

When the device 1000 provides the recommended words in a unit of extended word, the device 1000 may recommend extended words including the character input by a user, based on a use frequency of each of extended words stored in a database. In this case, since a use frequency is calculated (determined) in units of extended words, for example, “plays”, “playing”, and “played” are different extended words, and thus, even though all the three extended words include a verb “play”, a use frequency of each of “plays”, “playing”, and “played” may be calculated to be low. Accordingly, even when the user frequently uses expressions including “play”, extended words including “play” may not be preferentially recommended. By way of non-limiting example, when “planning” has been used 1,000 times, “plays” has been used 800 times, “planned” has been used 30 times, “playing” has been used 700 times, “plans” has been used 20 times, and “played” has been used 500 times, the user more frequently uses “play” than “plan”, but “planning”, “playing”, and “played” may be recommended in an order based on use frequencies calculated in units of extended words. Therefore, when the device 1000 provides recommended words for a character input by the user, a method of providing recommended words in smaller units than extended words is required.

According to various example embodiments, the device 1000 may provide various recommended words having different meanings to the user by first recommending the recommended words in units of pseudo-morphemes 111 for a character input by the user.

According to various example embodiments, when an input for selecting one of recommended at least one pseudo-morpheme 111 is received, the device 1000 may easily provide recommended words 131 in accordance with an intention of the user by recommending at least one extended word 131 including the selected pseudo-morpheme.

In addition, according to various example embodiments, the device 1000 may determine at least one pseudo-morpheme to be recommended and at least one extended word to be recommended, using various pieces of context information related to a character input by the user and determine a location at which a space is to be displayed.

Context information may include, for example, and without limitation, information about characters input by the user in the past, information about at least one extended word pre-displayed in the character input window, information about speech data input by the user in the past, and the like. The information about the characters input by the user in the past may include, for example, and without limitation, information about pseudo-morphemes and extended words frequently used by the user in the past and information about a pseudo-morpheme selected by the user from among pseudo-morphemes recommended by the device 1000. The information about the pre-displayed at least one extended word may include, for example, and without limitation, information about a part of speech and a sentence component of the at least one extended word pre-displayed in the character input window. For example, the information about the pre-displayed at least one extended word may include information indicating whether the extended word pre-displayed in the character input window corresponds to a subject or to a verb but is not limited thereto.

The device 1000 may, for example, be a smartphone, a tablet personal computer (PC), a PC, a smart TV, a cellular phone, a personal digital assistant (PDA), a laptop computer, a media player, a microserver, a global positioning system (GPS) device, an e-book terminal, a digital broadcasting terminal, a navigation machine, a kiosk, an MP3 player, a digital camera, a home appliance, or other mobile or non-mobile computing device, or the like but is not limited thereto. The device 1000 may be a wearable device having a communication function and a data processing function, such as a watch, glasses, a hair band, or a ring, or the like, but is not limited thereto. However, the device 1000 is not limited thereto and may include all types of devices capable of providing a response message.

In addition, the device 1000 may communicate with a server and another device through a network to use the context information including, for example, and without limitation, the information about the characters input by the user in the past, the information about the at least one extended word pre-displayed in the character input window, the information about the speech data input by the user in the past, and the like. In this case, the network refers, for example, to a data communication network having inclusive meaning, which includes, for example, and without limitation, a local area network (LAN), a wide area network (WAN), a value added network (VAN), a mobile radio communication network, a satellite communication network, and a combination thereof and enables network configuration entities to smoothly communicate with each other, and may include a wired Internet, a wireless Internet, and a mobile wireless communication network, or the like. Examples of wireless communication may include wireless LAN (Wi-Fi), Bluetooth, Bluetooth low energy, Zigbee, Wi-Fi Direct (WFD), ultra wideband (UWB), infrared data association (IrDA), and near field communication (NFC), or the like, but are not limited thereto.

Figure 2:
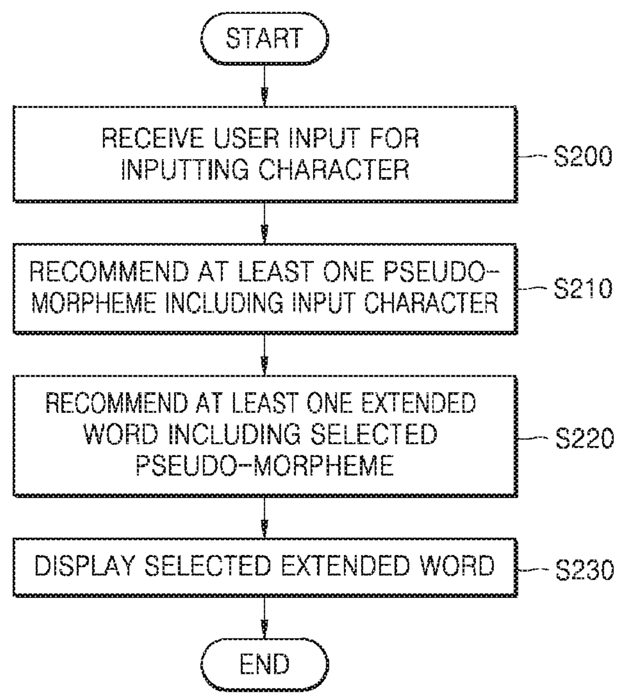
FIG. 2 is a flowchart illustrating an example method by which a device provides recommended words, according to various example embodiments.

FIG. 2 is a flowchart illustrating an example method by which the device 1000 provides recommended words, according to various example embodiments.

In operation S200, the device 1000 receives an input, for example, a user input for inputting a character in the character input window. In this case, a character input window of the device 1000 may include a window used to input a text message, a social network service (SNS) message, or the like, and the input character may include at least one alphabet or at least one syllable.

In operation S210, the device 1000 recommends at least one pseudo-morpheme including the input character by analyzing the input character. According to various example embodiments, the device 1000 may recommend the at least one pseudo-morpheme including the input character using context information of the input character. For example, the device 1000 may recommend the at least one pseudo-morpheme by considering statistical data about a general use frequency of each pseudo-morpheme, information about characters input by the user in the past, information about a pseudo-morpheme selected by the user from among pseudo-morphemes recommended by the device 1000, information about speech data input by the user in the past, and the like.

In operation S220, the device 1000 recommends at least one extended word including a selected pseudo-morpheme in response to an input for selecting one of the recommended at least one pseudo-morpheme.

The user may select a pseudo-morpheme intended for the user to input in the character input window from among the recommended at least one pseudo-morpheme. When the input for selecting a pseudo-morpheme is received, the device 1000 may recommend at least one extended word including the selected pseudo-morpheme. In this case, the device 1000 may recommend the at least one extended word using the context information of the input character. For example, the device 1000 may recommend the at least one extended word by considering the information about the characters input by the user in the past, information about at least one extended word pre-displayed in the character input window, the information about the speech data input by the user in the past, or the like, but is not limited thereto. When the selected pseudo-morpheme is an adjective, at least one extended word including the selected pseudo-morpheme may have a form in which a suffix (for example, -ly, -ness, or -less) is added to the adjective but is not limited thereto.

The device 1000 may also recommend at least one extended word including the selected pseudo-morpheme based on characteristic of the user for inputting characters. For example, the device 1000 may recommend at least one extended word including the selected pseudo-morpheme by considering an expression frequently used by the user.

The device 1000 may also recommend at least one other extended word including a selected extended word in response to an input selecting one of the recommend at least one extended word. For example, the device 1000 may recommend the at least one other extended word by considering the information about the characters input by the user in the past, the information about the at least one extended word pre-displayed in the character input window, the information about the speech data input by the user in the past, or the like, but is not limited thereto. In this case, the at least one other extended word including the selected extended word may include an extended word including another postfix added to the selected extended word but is not limited thereto. For example, when the selected extended word is “unhappy”, the at least one other extended word including the selected extended word may include “unhappiness” and “unhappily”.

In operation S230, the device 1000 displays a selected extended word in the character input window in response to an input for selecting one of the at least one other extended word. In addition, according to various example embodiments, the device 1000 may predict whether a space is located next to the selected extended word and display both the selected extended word and the space in the character input window based on the predicted result.

Although it has been described that pseudo-morphemes to be recommended, extended words to be recommended, and a location at which a space is to be displayed are respectively determined based on individual learning models, the present example embodiments are not limited thereto. At least two of the pseudo-morphemes to be recommended, the extended words to be recommended, and the location at which the space is to be displayed may be determined by one learning model.

In addition, according to various example embodiments, the device 1000 may learn criteria for the at least one pseudo-morpheme to be recommended, the at least one extended word to be recommended, and the location at which the space is to be displayed, by using a deep neural network (DNN).

Figure 3:
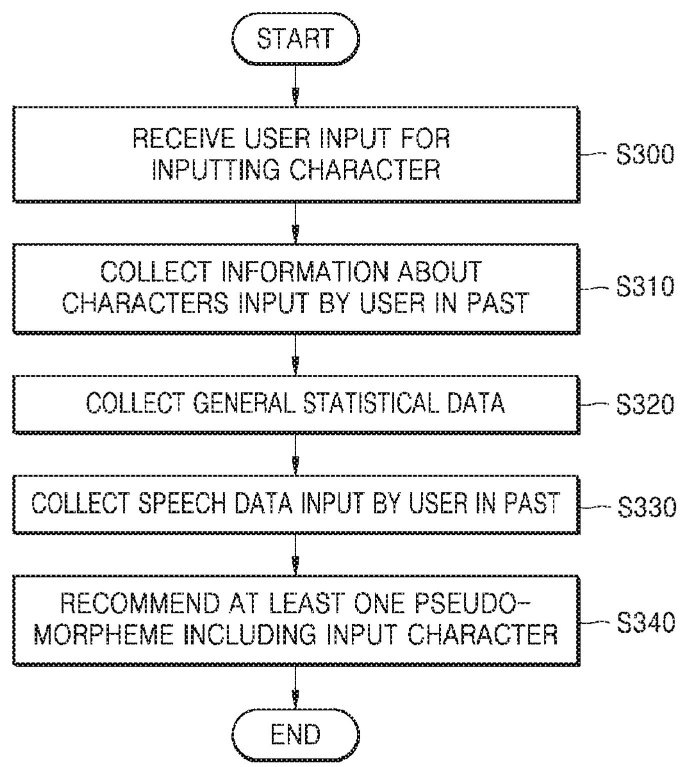
FIG. 3 is a flowchart illustrating an example method by which a device determines at least one pseudo-morpheme to be recommended, according to various example embodiments.

FIG. 3 is a flowchart illustrating an example method by which the device 1000 determines at least one pseudo-morpheme to be recommended, according to various example embodiments.

In operation S300, the device 1000 may receive a user input for inputting a character in the character input window. For example, the device 1000 may receive a user input for inputting a character in a window for inputting a text message, an SNS message, or the like therein. In this case, the input character may include at least one alphabet or at least one syllable.

In operation S310, the device 1000 may collect information about characters input by the user in the past. For example, the device 1000 may determine pseudo-morphemes to be recommended, by considering information about pseudo-morphemes, extended words, and the like frequently used by the user in the past.

In operation S320, the device 1000 may collect general statistical data about a use frequency of each of pseudo-morphemes stored in a database. The device 1000 may determine a pseudo-morpheme having the highest use frequency as a pseudo-morpheme to be recommended, by considering the general statistical data about the use frequency of each of the pseudo-morphemes.

In operation S330, the device 1000 may collect information about speech data input by the user in the past. The device 1000 may analyze speech data of the user, which has been input through a microphone, using various natural language analysis schemes and determine recommended words by considering information about the analyzed speech data.

Although it has been described for convenience with reference to FIG. 3 that the information about the characters input by the user in the past, the general statistical data about the use frequency of each of the pseudo-morphemes, and the information about the speech data input by the user in the past are sequentially collected, the device 1000 may collect the pieces of the information described above in parallel and learn a method of determining pseudo-morphemes to be recommended, by using the collected pieces of the information.

In operation S340, the device 1000 may recommend at least one pseudo-morpheme including the input character.

Figure 4:
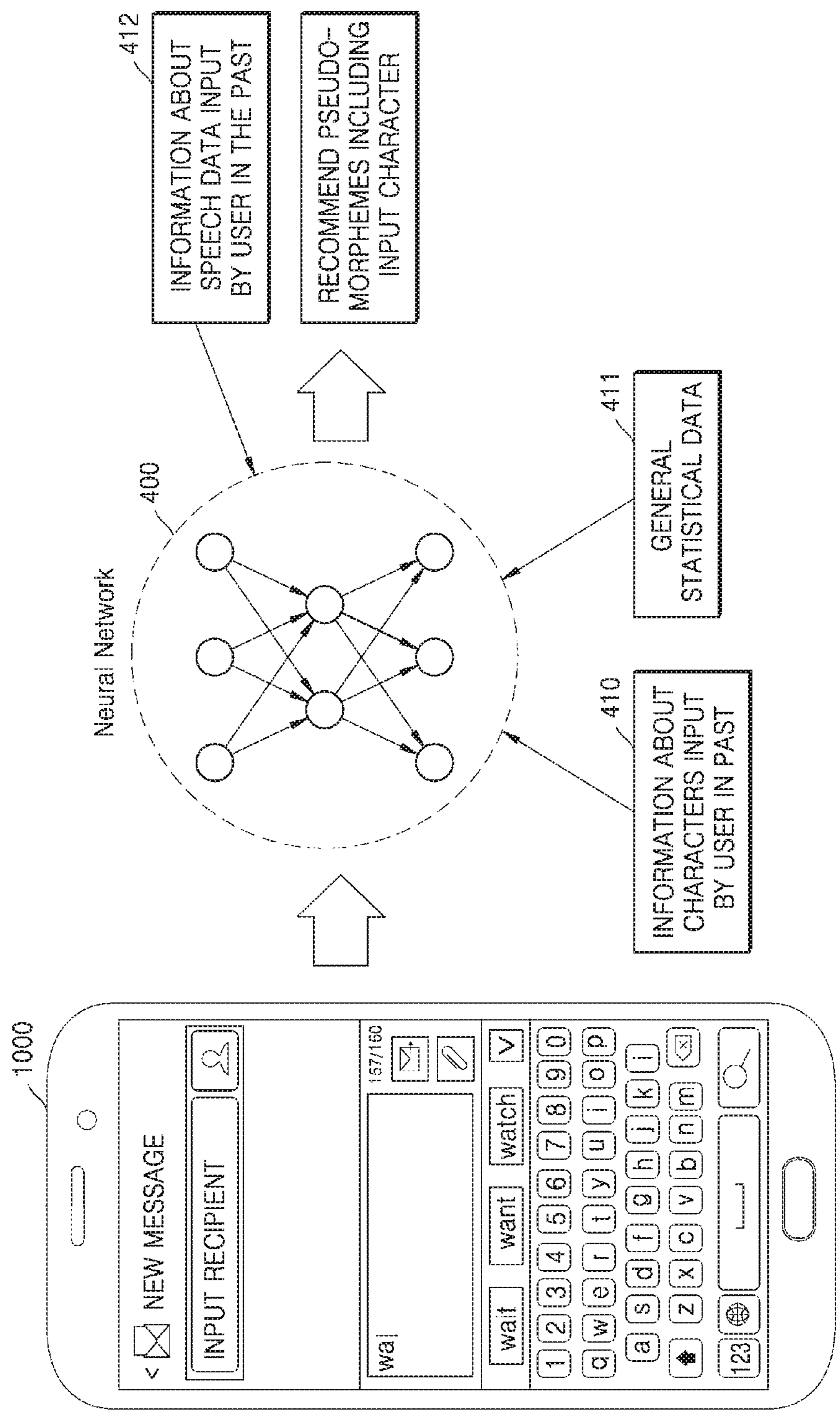
FIG. 4 is a diagram illustrating an example method by which a device determines recommended words, according to various example embodiments.

FIG. 4 is a diagram illustrating an example method by which the device 1000 determines recommended words, according to various example embodiments.

According to various example embodiments, the device 1000 may recommend at least one pseudo-morpheme including a character input by the user by analyzing the input character 420. The device 1000 may extract at least one pseudo-morpheme including the input character from a database including pseudo-morphemes. The device 1000 may determine at least one pseudo-morpheme to be recommended from among the at least one pseudo-morpheme extracted from the database, by considering various pieces of context information about the input character. According to various example embodiments, the device 1000 may determine, using one or more neural networks 400, the at least one pseudo-morpheme to be recommended from various pieces of context information about the input character. For example, referring to FIG. 4, the device 1000 may determine, using the one or more neural networks 400, the at least one pseudo-morpheme to be recommended from information 410 about characters input by the user in the past, general statistical data 411 about a use frequency of each pseudo-morpheme, information 412 about speech data input by the user in the past, and the like.

The device 1000 may learn a criterion for determining pseudo-morphemes to be recommended, a criterion for determining at least one extended word to be recommended, and a criterion for determining a location at which a space is to be displayed, using the information 410 about the characters input by the user in the past, the general statistical data 411 about the use frequency of each pseudo-morpheme, the information 412 about the speech data input by the user in the past, and the like. For example, which pseudo-morpheme is to be recommended, which extended word is to be recommended, and at which location a space is to be displayed may be determined based on learning according to a DNN technique including, for example, and without limitation, a recurrent neural network (RNN).

Figure 5A:
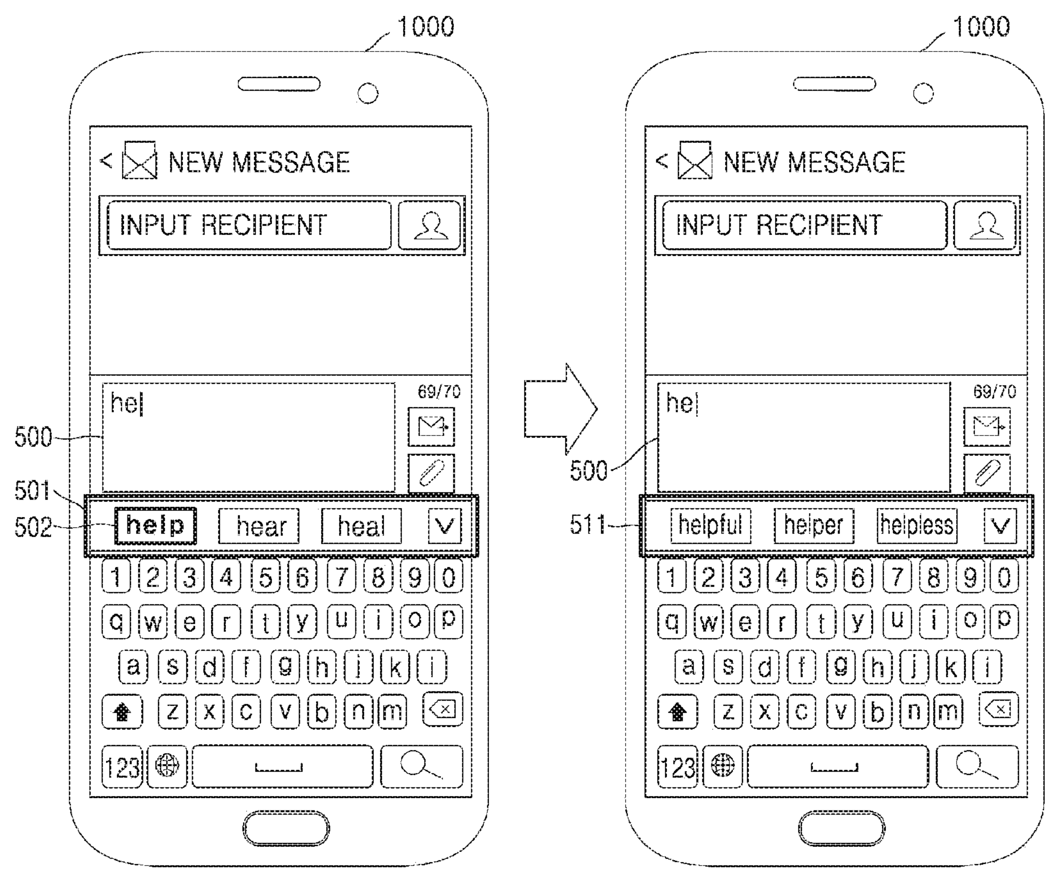
FIGS. 5A and 5B are diagrams illustrating examples in which a device recommends at least one pseudo-morpheme, according to various example embodiments.
Figure 5B:
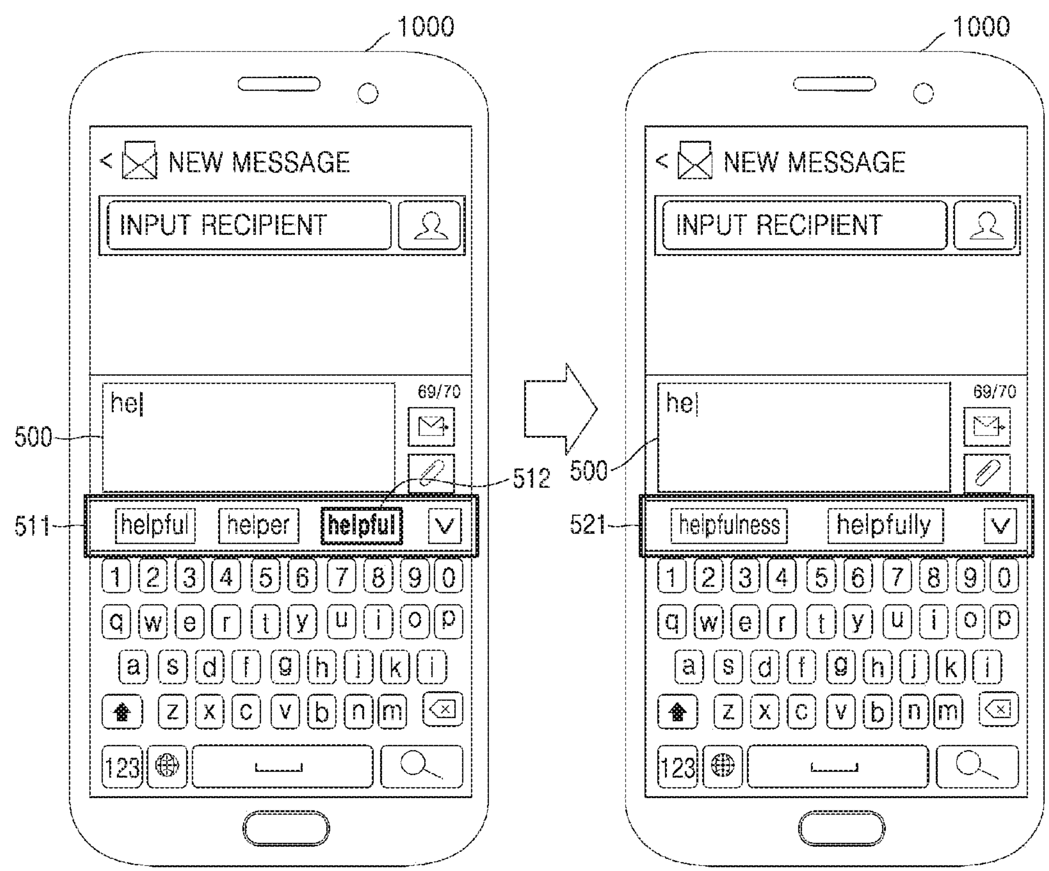

FIGS. 5A and 5B are diagrams illustrating examples in which the device 1000 recommends pseudo-morphemes, according to various example embodiments.

Referring to FIG. 5A, for example, when the user inputs a character “he” in a character input window 500 of the device 1000, the device 1000 may recommend “help”, “hear”, and “heal” as pseudo-morphemes 501 including “he”. In this case, the recommended at least one pseudo-morpheme 501 may be a result output when the character input by the user is input to an RNN. For example, the device 1000 may recommend at least one pseudo-morpheme 501 including “he” by considering information about characters input by the user in the past, general statistical data about a use frequency of each pseudo-morpheme, information about speech data input by the user in the past, or the like. Which ones of various pseudo-morphemes including “he” are to be recommended may be determined based on learning according to preset criteria.

According to various example embodiments, the device 1000 may display the recommended at least one pseudo-morpheme 501 outside the character input window 500. The user may select one pseudo-morpheme intended by the user from among the recommended at least one pseudo-morpheme. For example, as shown in FIG. 5A, the user may select “help” from among the recommended three pseudo-morphemes.

According to various example embodiments, the device 1000 may recommend at least one extended word 511 including a selected pseudo-morpheme in response to a user input for selecting one of at least one pseudo-morpheme. In this case, the recommended at least one extended word 511 may be a result output when the selected pseudo-morpheme is input to the RNN. For example, the device 1000 may recommend the at least one extended word 511 including the selected pseudo-morpheme by considering the information about the characters input from the user in the past, general statistical data about each extended word including the selected pseudo-morpheme, the information about the speech data input from the user in the past, and the like. When a pseudo-morpheme is a verb having a certain meaning, extended word including the pseudo-morpheme may have a form in which a suffix is added to the verb.

For example, referring to FIG. 5A, the device 1000 may recommend at least one extended word 511 including “help” in response to an input for selecting “help”. In this case, recommended extended words 511 may have a form in which a suffix is added to “help”, as illustrated in operation 511, such as “helpful”, “helper”, and “helpless”, but are not limited thereto.

In addition, according to some embodiments, the device 1000 may recommend at least one other extended word including a selected extended word in response to an input for selecting one of the recommended at least one extended word. For example, two or more suffixes may be connected to a verb to form one extended word. Another extended word (e.g., “helpfully”) may be formed by additionally connecting another suffix (e.g., “ly”) to one extended word formed by connecting a suffix (e.g., “ful”) to an infinitive of a verb (e.g., “help”). Accordingly, when an input for selecting one of the at least one extended word recommended by the device 1000 is received, the device 1000 may recommend at least one other extended word including the selected extended word. For example, referring to FIG. 5B, the user may select “helpful” 512 from among “helpful”, “helper”, and “helpless” which are extended word 511 recommended by the device 1000. In this case, the device 1000 may recommend “helpfulness” and “helpfully” as at least one other extended word 521 including “helpful”. The device may display the recommended “helpfulness” and “helpfully” outside the character input window 500.

As another example, in case of Korean, when a user inputs a character “sa” in a character input window of the device 1000, the device 1000 may recommend “sarang” corresponding to English “love”, “sagwa” corresponding to English “apple”, and “sajin” corresponding to English “picture” as pseudo-morphemes including “sa”. “sarang”, “sagwa”, and “sajin” are nouns having different meanings, and thus each of “sarang”, “sagwa”, and “sajin” may be a single pseudo-morpheme.

In response to an input of selecting “sarang” from among the recommended three pseudo-morphemes (“sarang”, “sagwa”, and “sajin”), the device 1000 may recommend at least one extended word (for example, Eojeol) including “sarang”. For example, the device 1000 may recommend, as extended words, “sarang-i” corresponding to English “love is”, “sarang-eul” corresponding to English “for love”, and “sarang-gwa” corresponding to English “with love”. In this case, the recommended extended words may have a form in which a postposition (for example, “i”, “eul”, or “gwa”) is added to a noun (for example, “sarang”), but is not limited thereto. Unlike English, in case of Korean, a unit of Eojeol in which a postposition “i”, “eul”, or “gwa” is added to a noun “sarang” may be written without a space.

According to an embodiment, the device 1000 may first recommend at least one pseudo-morpheme including a character input in the character input window 500 and then recommend at least one extended word including a pseudo-morpheme selected from among the recommended at least one pseudo-morpheme. Accordingly, the device 1000 may reduce an amount of data to be stored in a database than a case of providing recommended words in a unit of extended word. In addition, the device 1000 may effectively provide recommended words in accordance with an intention of the user by providing recommended words in a unit of pseudo-morpheme and then providing recommended words in a unit of extended word.

Figure 6A:
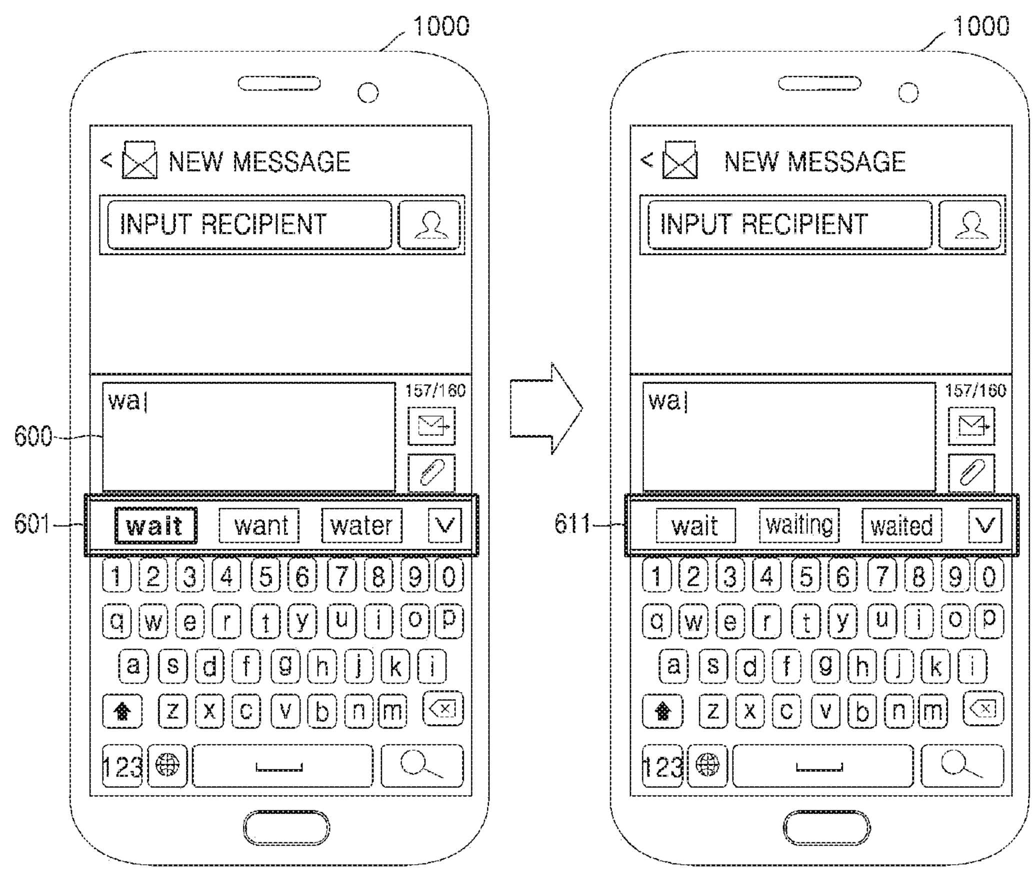
FIGS. 6A and 6B are diagrams illustrating examples in which a device recommends at least one pseudo-morpheme, according to various example embodiments.
Figure 6B:
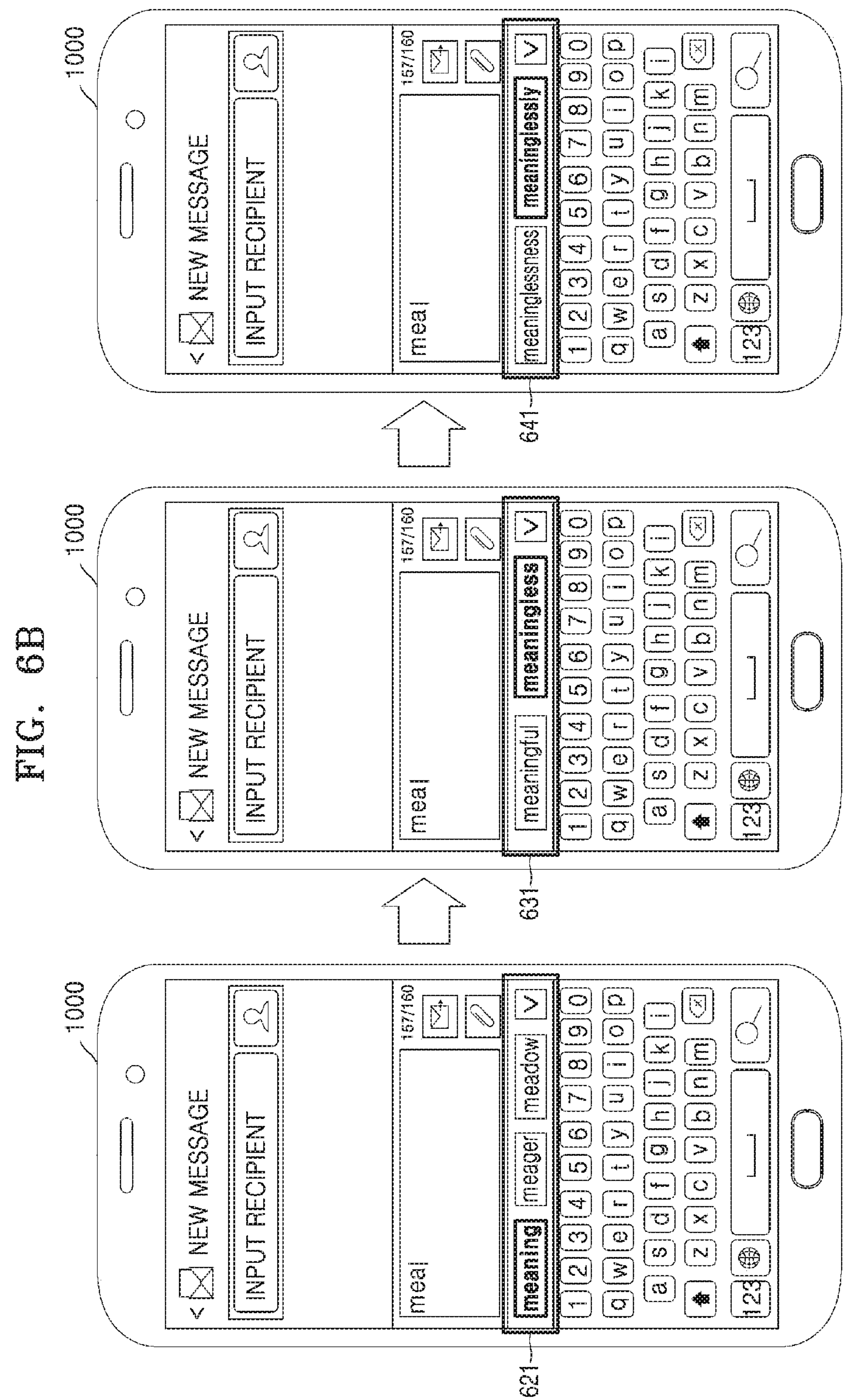

FIGS. 6A and 6B are diagrams illustrating examples in which the device 1000 recommends at least one pseudo-morpheme, according to various example embodiments.

Unlike Korean, English uses a space in a unit of word. Therefore, in case of English, each of noun, adjective, adverb, and infinitive verb, and the like which are units that cannot be divided any more may be one pseudo-morpheme. For example, when a pseudo-morpheme is an infinitive verb (e.g., "say"), one extended word including the pseudo-morpheme may indicate a changed form of the verb (e.g., "said", "says", or "saying") but is not limited thereto.

Referring to FIG. 6A, for example, when the user inputs "wa" in a character input window 600 of the device 1000, the device 1000 may recommend "wait", "want", and "water" as at least one pseudo-morpheme 601 including "wa".

The device 1000 may display the recommended at least one pseudo-morpheme 601 outside the character input window 600. The user may select one pseudo-morpheme intended by the user from among the recommended at least one pseudo-morpheme 601. In response to an input for selecting the one pseudo-morpheme, the device 1000 may recommend at least one extended word 611 including the selected pseudo-morpheme. For example, as illustrated in FIG. 6A, the user may select "wait" from among "wait", "want", and "water" which are the recommended three pseudo-morphemes 601. The device 1000 may recommend at least one extended word including "wait" in response to an input for selecting "wait". The device 100 may display the recommended at least one extended word 611 including "wait" outside the character input window 600 In this case, the recommended extended words 611 may have a changed form of an infinitive verb, such as "wait", "waiting", and "waited", but are not limited thereto. For example, when a pseudo-morpheme is a noun (e.g., "child"), recommended extended words may include nouns (e.g., "child", "children", and "childhood") derived from the pseudo-morpheme.

In addition, in response to an input for selecting one of the recommended at least one extended word, the device 1000 may recommend at least one other extended word including the selected extended word. For example, referring to FIG. 6B, when the user inputs "mea" in the character input window 600, the device 1000 may recommend "meaning", "meager", and "meadow" as pseudo-morphemes 621 including "mea". The device 100 may display "meaning", "meager", and "meadow" 621 outside the character input window 600.

In addition, in response to an input for selecting "meaning" from among the recommended pseudo-morphemes 621, the device 1000 may recommend "meaningless" and "meaningful" as extended words 631 including "meaning". The device 100 may display "meaningless" and "meaningful" 631 outside the character input window 600. Thereafter, when the user selects "meaningless" from among the recommended extended words 631, the device 1000 may further recommend "meaninglessness" and "meaninglessly" 641 including "meaningless". The device 100 may display "meaninglessness" and "meaninglessly" 641 outside the character input window 600. Accordingly, the device 1000 may increase the possibility of providing a pseudo-morpheme in accordance with an intention of the user by recommending at least one pseudo-morpheme based on a character input by the user.

Figure 7:
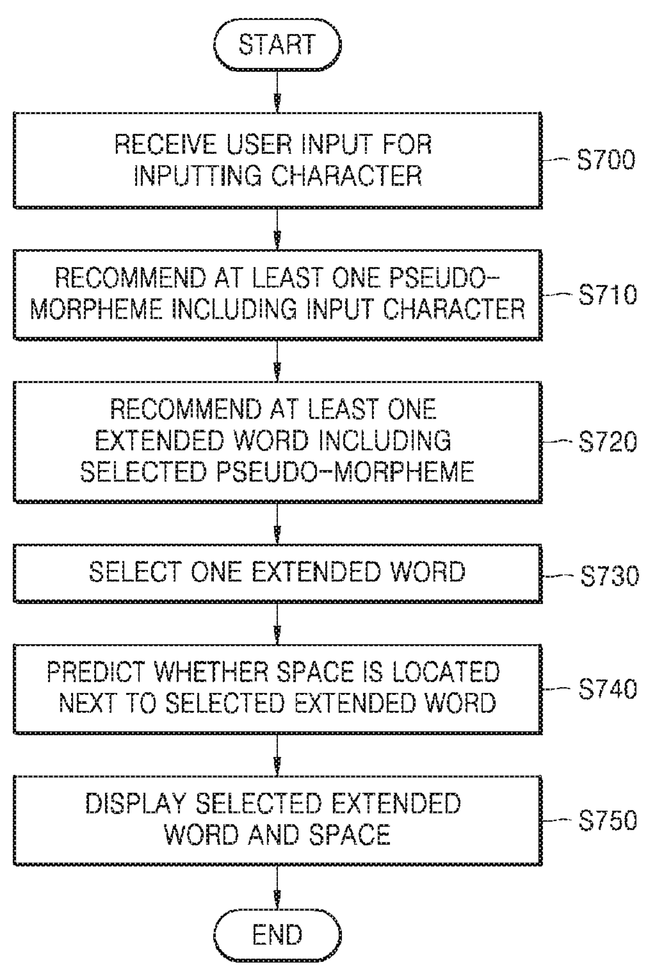
FIG. 7 is a flowchart illustrating an example method by which a device displays a space, according to various example embodiments.

FIG. 7 is a flowchart illustrating an example method by which the device 1000 displays a space, according to various example embodiments.

According to various embodiments, the device 1000 may predict whether a space is located next to an extended word selected from among recommended at least one extended word, based on context information about a character input by the user and context information about the user. The device 1000 may predict whether a space is located next to an extended word selected from among recommended at least one extended word, by using information about characters input by the user in the past, statistical data indicating a general use frequency of each pseudo-morpheme, information about speech data input by the user in the past, and the like.

In operation S700, the device 1000 may receive a user input for inputting a character. In this case, the input character may include at least one alphabet or at least one syllable.

In operation S710, the device 1000 may recommend at least one pseudo-morpheme including the input character. Since operations S700 and S710 correspond to operations S200 and S210 of FIG. 2, a detailed description thereof is not repeated here.

In operation S720, the device 1000 may recommend at least one extended word including a selected pseudo-morpheme in response to an input for selecting one of the recommended at least one pseudo-morpheme. The user may select a pseudo-morpheme intended by the user from among the at least one pseudo-morpheme recommended by the device 1000. Accordingly, the device 1000 may recommend at least one extended word including the pseudo-morpheme selected by the user. In this case, when the pseudo-morpheme is a noun, the at least one extended word including the pseudo-morpheme may have a form in which a suffix is connected to the noun.

In operation S730, the device 1000 may receive a user input for selecting one of the recommended at least one extended word. The user may select an extended word intended for the user to input in a character input window of the device 1000 from among the recommended at least one extended word.

In operation S740, the device 1000 may predict whether a space is located next to the selected extended word, in response to the input for selecting one of the recommended at least one extended word. For example, when the input for selecting one of the recommended at least one extended word is received, and the possibility of placing a space next to the selected extended word is high, the device 1000 may predict that the space is located next to the selected extended word. For example, when an extended word "meaningful" is selected by the user from among the recommended at least one extended word, an expression intended by the user may be another extended word including "meaningful", such as "meaningfully" or "meaningfulness". However, when an extended word "waiting" is selected by the user, the possibility of the appearance of a space may be higher than the possibility of the appearance of another extended word including "waiting". Therefore, the device 1000 may predict whether a space is located next to the selected extended word, based on information about character input by the user in the past, statistical data about general Eojeols having a high use frequency, and the like. In this case, whether a space is located next to the selected extended word may be predicted based on learning according to a DNN technique.

In operation S750, the device 1000 may display the selected extended word and the space in the character input window based on the prediction result. For example, when it is determined that the possibility of placing the space next to the selected extended word is high, the device 1000 may sequentially display the selected extended word and the space in the character input window.

In addition, according to some embodiments, when the space is displayed in the character input window, the device 1000 may recommend at least one pseudo-morpheme to be located next to the space, based on the at least one extended word displayed in the character input window.

Figure 8:
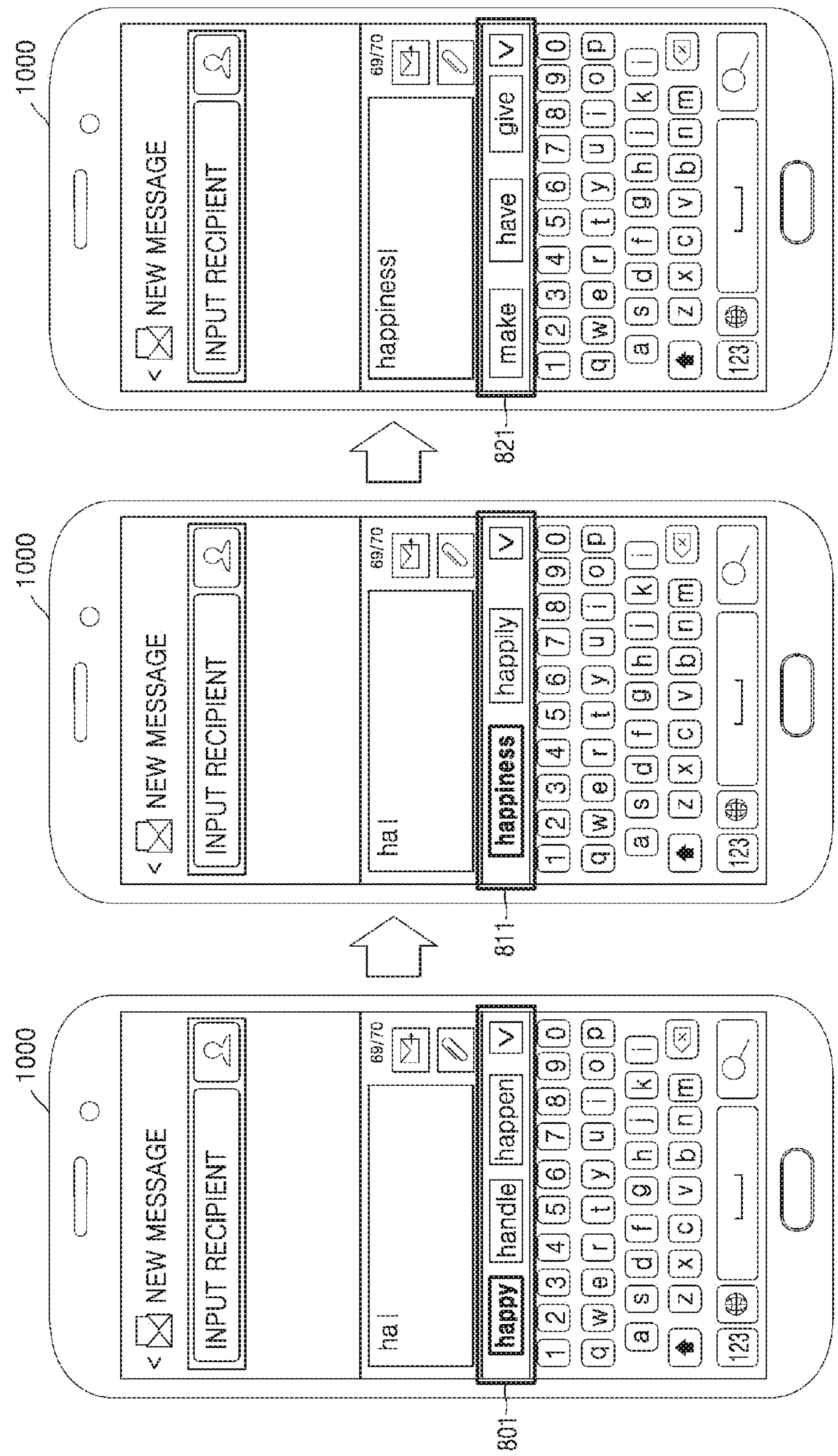
FIG. 8 is a diagram illustrating an example in which a device displays a space and recommends at least one pseudo-morpheme to be located next to the displayed space, according to various example embodiments.

FIG. 8 is a diagram illustrating an example of displaying a space and recommending at least one pseudo-morpheme to be located next to the displayed space, according to various example embodiments.

According to some embodiments, the device 1000 may recommend at least one pseudo-morpheme including a character input by the user and recommend at least one extended word including a selected pseudo-morpheme in response to a user input for selecting one of the recommended at least one pseudo-morpheme. In this case, when the user selects one of the recommended at least one extended word, the device 1000 may predict whether a space is located next to the selected extended word. When the device 1000 predicts that the space is located next to the selected extended word, the device 1000 may sequentially display the selected extended word and the space in a character input window. In addition, when the space is displayed in the character input window, the device 1000 may recommend at least one pseudo-morpheme to be located next to the space.

For example, referring to FIG. 8, when a user input for inputting "ha" in the character input window, the device 1000 may recommend "happy", "handle", and "happen" 801, and display the recommended pseudo-morphemes 801 outside the character input window. Thereafter, when a user input for selecting "happy" is received, the device 1000 may recommend "happiness", and "happily" as at least one extended word 811 including "happy". The device 1000 may display the recommended extended words 811 outside the character input window. In this case, when a user input for selecting "happiness" is received, the device 1000 may predict whether a space is located next to "happiness". The device 1000 may collect information about whether there exists another extended word including the extended word "happiness", a use frequency of another extended word including "happiness", characteristic of the user for inputting characters, and statistical data of a case where a space is located next to "happiness". The device 1000 may learn a location at which a space is to be located, based on the collected information. Referring to FIG. 8, when the device 1000 predicts that a space is located next to "happiness", the device 1000 may sequentially display "happiness" and the space in the character input window.

According to some embodiments, when the space is displayed in the character input window, the device 1000 may recommend at least one pseudo-morpheme to be located next to the space. Referring to FIG. 8, when the space is displayed in the character input window, the device 1000 may recommend "make", "have", "give" 821 and the like as at least one pseudo-morpheme to be located next to "happiness", and display the recommended pseudo-morphemes 821 outside the character input window.

Figure 9:
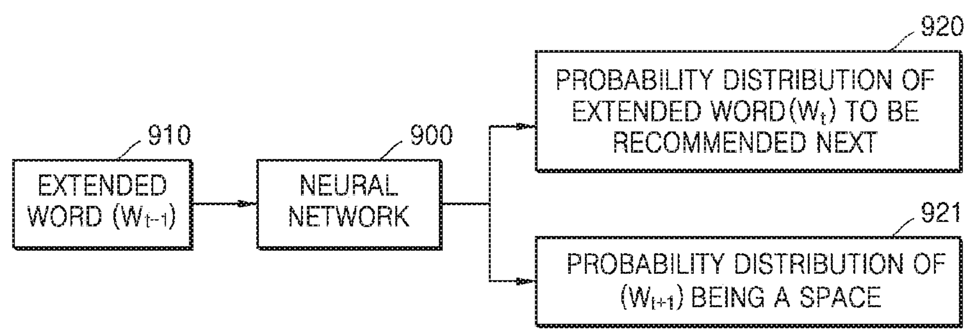
FIG. 9 is a block diagram illustrating an example of a neural network according to various example embodiments.

FIG. 9 is a block diagram illustrating an example of a neural network 900 according to various example embodiments.

According to some embodiments, the device 1000 may determine a second extended word $W_t$ to be recommended next to a pre-recommended first extended word $W_{t-1}$ using the neural network 900 and determine whether a space is displayed.

Referring to FIG. 9, when the first extended word $W_{t-1}$ pre-recommended by the device 1000 is input to the neural network 900, a probability distribution 920 of the second extended word $W_t$ to be located next to the first extended word $W_{t-1}$ and a probability distribution 921 of a space to be located next to the second extended word $W_t$ may be output based on learning according to a neural network technique. For example, the probability distribution 920 of the second extended word $W_t$ may indicate a probability that each extended word including the first extended word $W_{t-1}$ is located next to the pre-recommended extended word $W_{t-1}$. In addition, the probability distribution 921 of a space to be located next to the second extended word $W_t$ may indicate a probability that a space is located next to the second extended word $W_t$. The device 1000 may determine an extended word having a high probability distribution among extended words including the first extended word $W_{t-1}$, as the second extended word $W_t$ to be located next to the first extended word $W_{t-1}$.

The neural network 900 may update a learning result every time one extended word is input. For example, the probability distribution 920 of the second extended word $W_t$ and the probability distribution 921 of the space in the neural network 900 may be used again to update a learning result of the neural network 900.

Figure 10:
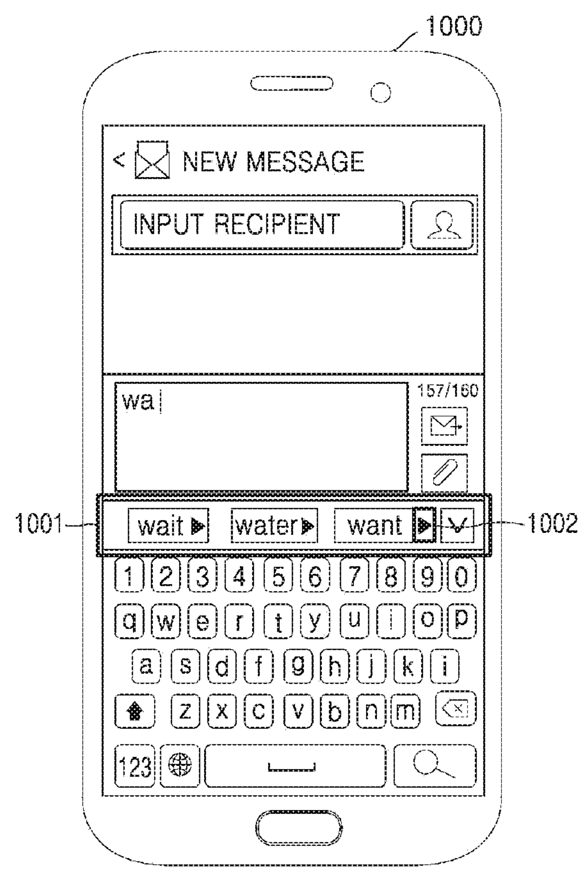
FIG. 10 is a diagram illustrating an example in which a device differently displays pseudo-morphemes to indicate whether an extended word to be recommended exists, according to various example embodiments.

FIG. 10 is a diagram illustrating an example in which the device 1000 differently displays pseudo-morphemes to indicate whether an extended word to be recommended exists, according to various example embodiments.

According to various example embodiments, when the device 1000 recommends at least one pseudo-morpheme including a character input by the user, the device 1000 may differently display the recommended at least one pseudo-morpheme to indicate whether there exists an extended word to be recommended, which includes a pseudo-morpheme. For example, referring to FIG. 10, the device 1000 may recommend "wait", "water", and "want" as pseudo-morphemes 1001 including "wa" in response to a user input for inputting characters "wa". In this case, the device 1000 may allow the user to easily identify whether there exists at least one extended word to be recommended, which includes each pseudo-morpheme, for "wait", "water", and "want". For example, as illustrated in FIG. 10, the device 1000 may differently display a pseudo-morpheme using a certain figure (e.g., a triangle) 1002 beside the pseudo-morpheme. According to various example embodiments, the device 1000 may differently display a pseudo-morpheme by highlighting using a certain color, but is not limited thereto.

Figure 11:
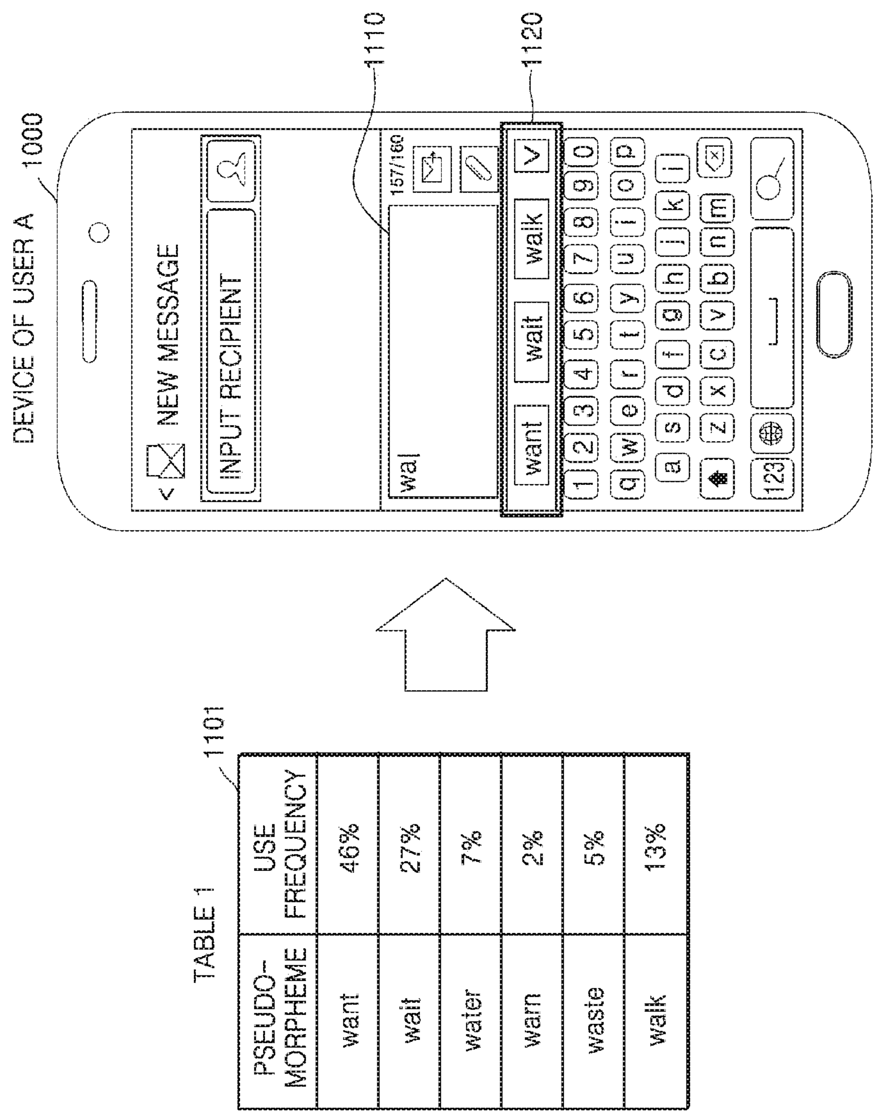
FIG. 11 is a diagram illustrating an example in which a device recommends pseudo-morphemes by considering a use frequency by a user with regard to each of the pseudo-morphemes, according to various example embodiments.

FIG. 11 is a diagram illustrating an example in which the device 1000 recommends pseudo-morphemes considering a use frequency by the user with regard to each of the pseudo-morphemes, according to various example embodiments.

According to various example embodiments, when the device 1000 recommends at least one pseudo-morpheme including a character input by the user, the device 1000 may recommend the at least one pseudo-morpheme by considering a use frequency of the user with regard to each pseudo-morpheme. The device 1000 may recommend at least one pseudo-morpheme by considering not only information about a general use frequency of each pseudo-morpheme but also statistical data about a general use frequency of characters input from the user in the past, information about a pseudo-morpheme selected by the user from among the at least one pseudo-morpheme recommended by the device 1000, information about speech data input by the user in the past, and the like. For example, the device 1000 may collect information about characters input by the user in the past, information about a pseudo-morpheme selected by the user in the past from among the at least one pseudo-morpheme recommended by the device 1000, information about speech data input by the user in the past, and the like. The device 1000 may learn a pseudo-morpheme frequently used by the user by using the collected information and set, based on the learned result, a relatively large weight to the pseudo-morpheme frequently used by the user. When a new character is input by the user, or an input for selecting one of recommended pseudo-morphemes is received, the device 1000 may update information about a use frequency of the user with regard to each pseudo-morpheme. The device 1000 may recommend at least one pseudo-morpheme by considering weights set to pseudo-morphemes.

For example, referring to FIG. 11, Table 1 1101 shows a list of pseudo-morphemes frequently used by a user A. For example, when the user A inputs characters "wa" in a character input window 1110 of the device 1000, the device 1000 may preferentially recommend the pseudo-morphemes frequently used by the user A from among pseudo-morphemes including "wa". For example, when the user A frequently uses "want", "wait", and "walk" in their order among the pseudo-morphemes including "wa", the device 1000 may preferentially recommend "want", "wait", and "walk" 1120. Accordingly, the device 1000 may effectively recommend a pseudo-morpheme in accordance with an intention of the user A.

Figure 12:
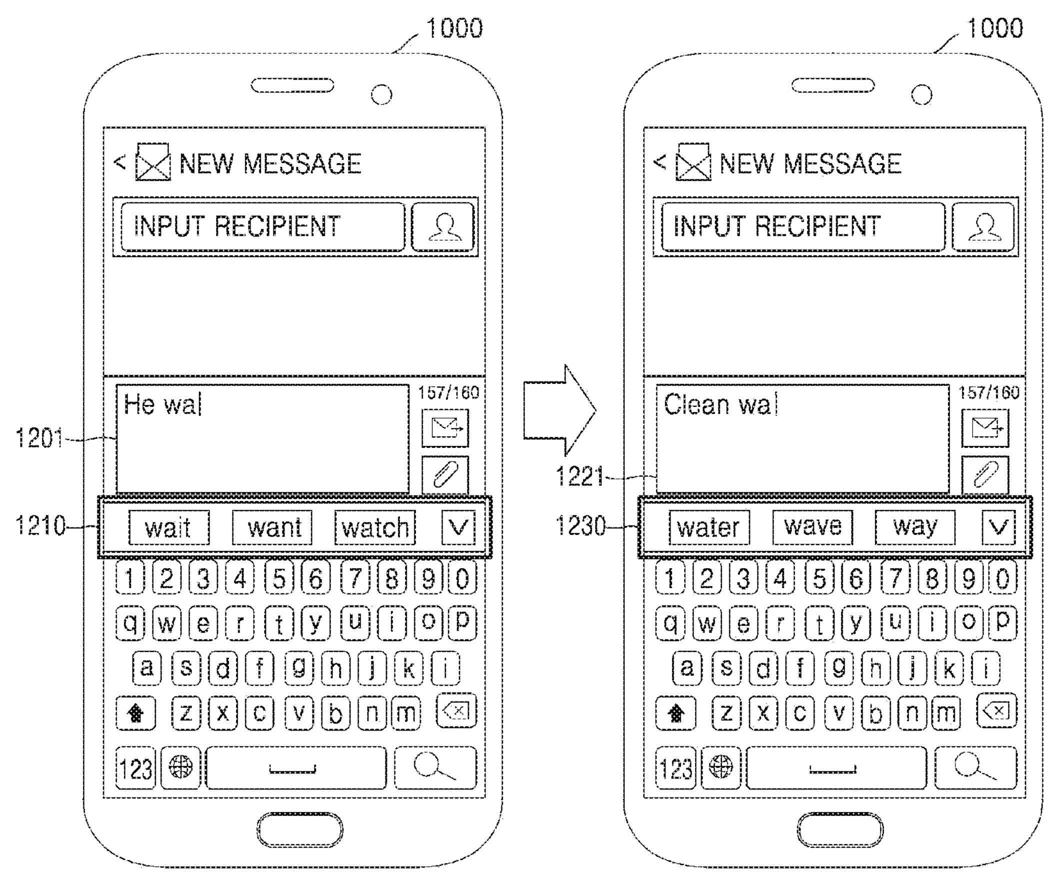
FIG. 12 is a diagram illustrating examples in which a device recommends pseudo-morphemes by considering a type and order of at least one pre-displayed extended word, according to various example embodiments.

FIG. 12 is a diagram illustrating examples in which the device 1000 recommends pseudo-morphemes considering a type and order of at least one pre-displayed extended word, according to various example embodiments.

In a language expression including at least two extended words, a type of an extended word to be located next may depend on a type of a previously located extended word. In this case, a type of an extended word may include a type of parts of speech including noun, adjective, and verb or components of sentence including subject, verb, object, and complement but is not limited thereto. For example, a probability that a verb is located next to an extended word corresponding to a subject is relatively high, and a probability that a noun is located next to an adjective is relatively high. Therefore, the device 1000 may recommend a pseudo-morpheme and an extended word fit to a context by recommending at least one pseudo-morpheme in consideration of a type and order of at least one extended word pre-displayed in a character input window.

For example, referring to FIG. 12, when an extended word pre-displayed in a character input window 1201 of the device 1000 is "He", and the user inputs characters "wa" as a part of an extended word to be located next to "He", a probability that a verb is located next to "He" corresponding to a subject is relatively high. Therefore, the device 1000 may recommend "wait", "want", and "watch" 1210 which are verbs among pseudo-morphemes including "wa".

As another example, when an extended word pre-displayed in a character input window 1221 of the device 1000 is "Clean", and the user inputs characters "wa" as a part of an extended word to be located next to "Clean", a probability that a noun is located next to "Clean" belonging to an adjective is relatively high. Therefore, the device 1000 may recommend "water", "wave", and "way" 1230 which are nouns among pseudo-morphemes including "wa".

Figure 13:
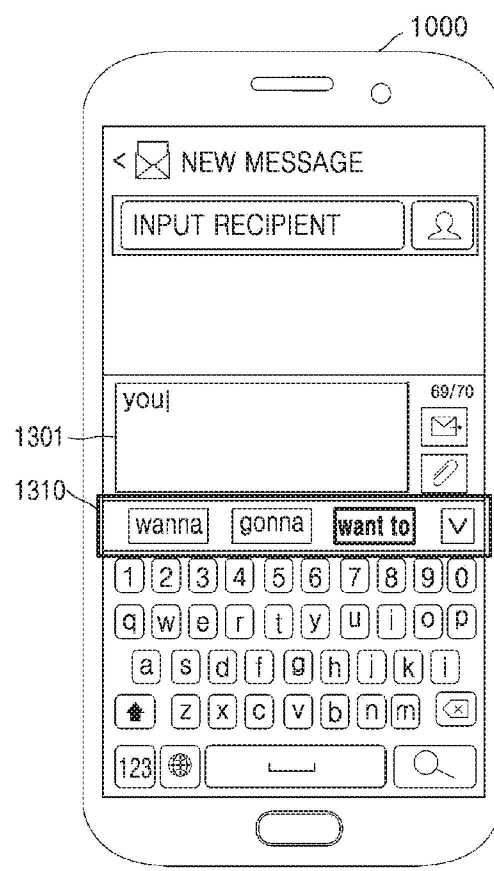
FIG. 13 is a diagram illustrating an example in which a device recommends at least one extended word by considering a characteristic of a user for inputting characters, according to various example embodiments.

FIG. 13 shows an example in which the device 1000 recommends at least one extended word by considering a characteristic of the user for inputting characters, according to some embodiments.

The character input characteristic of the user may indicate expressions frequently used by the user. For example, the user may more frequently use expressions "wanna" and "gimme" than expressions "want to" and "give me". The device 1000 may collect information about characters input by the user in the past, information about an extended word selected by the user in the past from among at least one extended word recommended by the device 1000, information about speech data input by the user in the past, and the like. The device 1000 may detect the characteristic of the user for inputting characters by using the collected information. For example, the device 1000 may detect the characteristic of the user for inputting characters by perform learning according to a neural network technique. When the characteristic of the user for inputting characters is detected, which information is to be used may be determined according to learning under a preset criterion.

For example, referring to FIG. 13, when "you" and a space are displayed on a character input window 1301, the device 1000 may recommend at least one pseudo-morpheme to be located next to the space. In this case, the device 1000 may recommend the at least one pseudo-morpheme to be located next to the space by considering a character input characteristic of the user. For example, when the user more frequently uses expressions "wanna" and "gonna" rather than expressions "want to" and "going to", the device 1000 may preferentially recommend "wanna" and "gonna" rather than "want to" and "going to" as the at least one pseudo-morpheme to be located next to the space. Accordingly, the device 1000 may display the recommended pseudo-morphemes 1310 (for example, "wanna", "gonna", and "want to") outside the character input window 1301.

Figure 14:
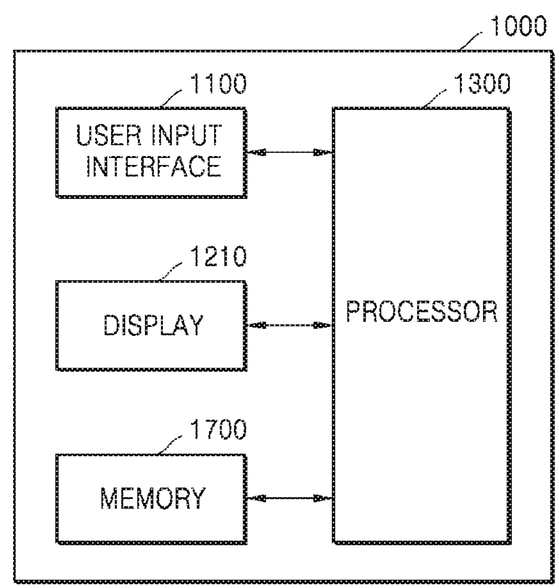
FIG. 14 is a block diagram illustrating an example device according to various example embodiments.

FIGS. 14 and 15 are block diagrams illustrating the example device 1000 according to various example embodiments.

As illustrated in FIG. 14, the device 1000 according to various example embodiments may include a user input interface (e.g., including input circuitry) 1100, a display 1210, a processor (e.g., including processing circuitry) 1300, and a memory 1700. However, not all of the components illustrated in FIG. 14 are mandatory components of the device 1000. The device 1000 may be implemented by more or less components than the components shown in FIG. 14.

For example, as illustrated in FIG. 15, the device 1000 according to various example embodiments may further include an output interface (e.g., including output circuitry) 1200, a sensor 1400, an audio/video (NV) input unit (e.g., including A/V input circuitry) 1600, and a communication interface (e.g., including communication circuitry) 1500 besides the user input interface 1100, the display 1210, the processor 1300, and the memory 1700.

The user input interface 1100 may include various input circuitry through which the user inputs data for controlling the device 1000. For example, the user input interface 1100 may include various input circuitry, such as, for example, and without limitation, a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, or the like but is not limited thereto.

According to various example embodiments, the user input interface 1100 may receive a user input for inputting a character in a character input window of the device 1000. The user input interface 1100 may receive a user input for selecting one of recommended at least one pseudo-morpheme or a user input for selecting one of recommended at least one extended word. In addition, the user input interface 1100 may receive a user input for inputting a space in the character input window of the device 1000. However, the user input interface 1100 is not limited to the examples described above.

An output interface 1200 may include various output circuitry to output an audio signal, a video signal, or a vibration signal and may include the display 1210, an acoustic output interface 1220, and a vibration motor 1230.

The display 1210 displays information processed by the device 1000. For example, according to some embodiments, the display 1210 may display a user interface for providing recommended words based on a character input by the user. In addition, the display 1210 may display at least one pseudo-morpheme recommended based on a character input by the user and at least one extended word recommended according to selection of one of the recommended at least one pseudo-morpheme.

The acoustic output interface 1220 may include various output circuitry to output audio data received through the communication interface 1500 or stored in the memory 1700. In addition, the acoustic output interface 1220 may output an acoustic signal related to a function (e.g., a call signal reception sound, a message reception sound, or an alarm sound) performed by the device 1000.

The vibration motor 1230 may include various circuitry and output a vibration signal. For example, the vibration motor 1230 may output a vibration signal corresponding to an output of audio data or video data (e.g., a call signal reception sound or a message reception sound). In addition, the vibration motor 1230 may output a vibration signal when a touch is input through a touch screen.

The processor 1300 may include various processing circuitry and commonly control a general operation of the device 1000. For example, the processor 1300 may generally control the user input interface 1100, the output interface 1200, the sensor 1400, the communication interface 1500, the A/V input interface 1600, and the like by executing programs stored in the memory 1700. In addition, the processor 1300 may perform the operations of the device 1000, which are disclosed with respect to FIGS. 1 through 14, by executing the programs stored in the memory 1700.

According to various example embodiments, the processor 1300 may be configured to recommend at least one pseudo-morpheme including an input character by analyzing the input character. The processor 1300 may be configured to recommend at least one pseudo-morpheme including an input character by using context information of the input character and context information of the user. For example, the processor 1300 may be configured to recommend at least one pseudo-morpheme by considering information about a general use frequency of each pseudo-morpheme, information about characters input by the user in the past, information about a pseudo-morpheme selected by the user from among pseudo-morphemes recommended by the device 1000, information about speech data input by the user in the past, or the like, but is not limited thereto.

According to various example embodiments, the processor 1300 may be configured to recommend at least one extended word including a selected pseudo-morpheme in response to an input for selecting one of the recommended at least one pseudo-morpheme. The user may select a pseudo-morpheme intended for the user to input in a character input window from among the recommended at least one pseudo-morpheme. When an input for selecting the pseudo-morpheme is received, the processor 1300 may be configured to recommend at least one extended word including the selected pseudo-morpheme. In this case, when the selected pseudo-morpheme is a noun having meaning, the at least one extended word including the pseudo-morpheme may have a form in which a suffix is added to the noun but is not limited thereto.

The processor 1300 may also be configured to recommend at least one extended word including the selected pseudo-morpheme based on a characteristic of the user for inputting characters. For example, the device 1000 may recommend at least one extended word including the selected pseudo-morpheme by considering an expression frequently used by the user.

In addition, the processor 1300 may be configured to recommend at least one other extended word including a selected extended word in response to an input for selecting one of the recommended at least one extended word. In this case, the at least one other extended word including the selected extended word may include an extended word in which another suffix is added to the selected extended word but is not limited thereto.

In addition, the processor 1300 may be configured to provide recommended extended words by using a data recognition model stored in the memory 1700 or a server, and this will be described in greater detail below with reference to FIGS. 16 through 19.

In addition, the processor 1300 may efficiently learn a criterion for determining pseudo-morphemes to be recommended, by using the data recognition model stored in the memory 1700 or a server 2000 and provide a recommended extended word in accordance with an intention of the user according to the learned result.

The sensor 1400 may include various sensors and detect a state of the device 1000 or an ambient state of the device 1000 and transmit the detected information to the processor 1300. The sensor 1400 may be used to generate a part of context information indicating an ambient situation of the user or the device 1000

The sensor 1400 may include various sensors (e.g., including sensing circuitry), such as, for example, and without limitation, at least one of a magnetic sensor 1410, an acceleration sensor 1420, a temperature/humidity sensor 1430, an IR sensor 1440, a gyroscope sensor 1450, a position sensor (e.g., global positioning system (GPS)) 1460, an atmospheric pressure sensor 1470, a proximity sensor 1480, and an RGB (illuminance) sensor 1490 but is not limited thereto. A function of each sensor may be intuitively inferred by those of ordinary skill in the art from a name thereof, and thus a detailed description thereof is omitted herein.

The communication interface 1500 may include at least one component for communicating between the device 1000 and another device (not shown) or the server 2000. Another device (not shown) may be a computing device such as the device 1000, or a sensing device but is not limited thereto. For example, the communication interface 1500 may include various communication circuitry, such as, for example, and without limitation, a short-range wireless communication interface 1510, a mobile communication interface 1520, and a broadcast reception interface 1530, or the like.

The short-range wireless communication interface 1510 may include various short-range wireless communication circuitry, such as, for example, and without limitation, one or more of a Bluetooth communication interface, a Bluetooth low energy (BLE) communication interface, a near-field communication (NFC)/radio-frequency identification (RFID) interface, a wireless local area network (WLAN), (Wi-Fi) communication interface, a Zigbee communication interface, an infrared data association (IrDA) communication interface, a Wi-Fi Direct (WFD) communication interface, an ultra-wideband (UWB) communication interface, an Ant+ communication interface, or the like, but is not limited thereto.

The mobile communication interface 1520 may include various mobile communication circuitry and transmits and receives a wireless signal to and from at least one of a base station, an external terminal, and a server in a mobile communication network. Herein the wireless signal may include a voice call signal, a video call signal, or various types of data according to text/multimedia message transmission and reception.

The broadcast reception interface 1530 may include various broadcast reception circuitry and receives a broadcast signal and/or broadcast related information from the outside through a broadcast channel, and the broadcast channel may include a satellite channel and a terrestrial channel. According to implementation examples, the device 1000 may not include the broadcast reception interface 1530.

In addition, the communication interface 1500 may request another device (not shown) or the server 2000 (see, e.g., FIG. 19) for a response message in response to a speech input of the user and transmit and receive information required to execute an operation related to the response message to and from another device (not shown) or the server 2000.

The A/V input interface 1600 may include various A/V input circuitry to input an audio signal or a video signal and may include, for example, and without limitation, one or more of a camera 1610, a microphone 1620, or the like. The camera 1610 may obtain an image frame of a still image, a moving picture, or the like through an image sensor in a video call mode or a capturing mode. An image captured through the image sensor may be processed by the processor 1300 or a separate image processor (not shown). An image captured by the camera 1610 may be used as context information of the user.

The microphone 1620 may receive an external acoustic signal and process the external acoustic signal to electrical voice data. For example, the microphone 1620 may receive an acoustic signal from an external device or the user. The microphone 1620 may receive a speech input of the user. The microphone 1620 may use various noise cancellation algorithms to cancel noise generated during a process of receiving an external acoustic signal.

The memory 1700 may store programs for processing and control of the processor 1300 and store data input to the device 1000 or output from the device 1000.

The memory 1700 may include at least one type of storage medium from among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc, or the like, but is not limited thereto.

The programs stored in the memory 1700 may be classified into a plurality of modules including various program elements according to functions thereof, e.g., a user interface (UI) module 1710, a touch screen module 1720, an alarm module 1730, and the like.

The UI module 1710 may include various processing circuitry and/or program elements that when executed by the processor 1300 provide a specified UI, a specified graphic UI (GUI), or the like interoperating with the device 1000 for each application. The touch screen module 1720 may include various circuitry and sense a touch gesture of the user on a touch screen and transmit information regarding the touch gesture to the processor 1300. According to some embodiments, the touch screen module 1720 may recognize and analyze a touch code. The touch screen module 1720 may be configured by separate hardware including a controller.

The alarm module 1730 may generate a signal for informing of the occurrence of an event of the device 1000. Examples of the event occurring in the device 1000 may include call signal reception, message reception, hey signal input, and schedule alarm. The alarm module 1730 may output an alarm signal in a video signal form through the display 1210, in an audio signal form through the acoustic output interface 1220, or in a vibration signal form through the vibration motor 1230.

Figure 16:
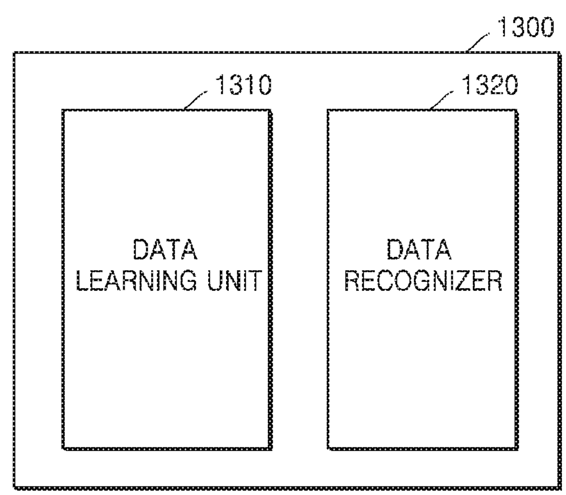
FIG. 16 is a block diagram illustrating an example processor according to various example embodiments.

FIG. 16 is a block diagram illustrating an example configuration of the processor 1300 according to various example embodiments.

Referring to FIG. 16, the processor (e.g., including processing circuitry) 1300 according to various example embodiments may include a data learning unit (e.g., including processing circuitry and/or program elements) 1310 and a data recognizer (e.g., including processing circuitry and/or program elements) 1320.

The data learning unit 1310 may learn a criterion for determining recommended words for a character input by the user. For example, the data learning unit 1310 may learn a criterion for determining pseudo-morphemes to be recommended and extended words to be recommended according to a character input by the user. In addition, the data learning unit 1310 may learn a criterion for determining whether to display a space next to a recommended extended word. In addition, the data learning unit 1310 may learn a criterion related to which data is to be used to determine pseudo-morphemes to be recommended and extended words to be recommended and determine whether to display a space. The data learning unit 1310 may learn a criterion for determining recommended words for a character input by the user by acquiring learning data to be used for the learning and applying the acquired learning data to a data recognition model to be described below.

For example, the data learning unit 1310 may use, as learning data for learning the criteria, information regarding characters or speech data input by the used in the past, information regarding a pseudo-morpheme selected by the user from among at least one pseudo-morpheme recommended by the device 1000, information regarding an extended word selected by the user from among at least one extended word recommended by the device 1000, and statistical data regarding a common use frequency of the user for each of pseudo-morpheme or extended words.

The data learning unit 1310 may allow a data recognition model to learn based on the learning data through unsupervised learning. For example, the data learning unit 1310 may allow the data recognition model to learn such that a relatively higher probability or weight is set to a pseudo-morpheme or extended word having a high use frequency of the user.

The data learning unit 1310 may allow the data recognition model to learn such that a probability or weight that a space is located next to a specific extended word is set for each specific extended word, by using learning data (for example, statistical data of a case where a space is located next to a specific extended word).

The data learning unit 1310 may allow the data recognition model to learn or to be updated by using a feedback of the user according to a recognition result. In detail, the data learning unit 1310 may allow the data recognition model to learn such that a higher weight is set to a pseudo-morpheme or extended word selected by the user from among at least pseudo-morphemes or extended words recommended by the device 1000.

The data recognizer 1320 may determine recommended words for a character input by the user, based on data. For example, the data recognizer 1320 may determine at least one pseudo-morpheme including the character input by the user by using a learning result related to pseudo-morphemes to be recommended. In addition, the data recognizer 1320 may determine at least one extended word including a pseudo-morpheme selected by the user, by using a learning result related to extended words to be recommended. As another example, the data recognizer 1320 may determine whether a space is displayed next to an extended word selected by the user, by using a learning result related to a location of the space. The data recognizer 1320 may determine at least one pseudo-morpheme to be recommended and at least one extended word to be recommended, by using a learned data recognition model and determine whether a space is displayed. The data recognizer 1320 may acquire certain data according to a criterion preset through learning and use the data recognition model by setting the acquired data to an input value. In addition, the data recognizer 1320 may determine at least one pseudo-morpheme to be recommended and at least one extended word to be recommended, based on certain data and determine whether to display a space, by using the data recognition model. In addition, a result value output from the data recognition model by setting the acquired data to an input value may be used to update the data recognition model.

For example, the data recognizer 1320 may acquire a character input by the user as recognition data. The data recognizer 1320 may acquire at least one pseudo-morpheme by applying the acquired character to the data recognition model. For example, the data recognizer 1320 may acquire a certain number of pseudo-morphemes according to an order of a higher use probability of the user or an order of a higher weight by applying the acquired character to the data recognition model.

The data recognizer 1320 may acquire, as recognition data, a pseudo-morpheme input by the user or selected from among a plurality of pseudo-morphemes. The data recognizer 1320 may determine at least one extended word by applying the acquired pseudo-morpheme to the data recognition model. For example, the data recognizer 1320 may acquire a certain number of pseudo-morphemes according to an order of a higher use probability of the user or an order of a higher weight by applying the acquired pseudo-morpheme to the data recognition model.

The data recognizer 1320 may acquire, as recognition data, an extended word input by the user or selected by the user from among a plurality of extended words. The data recognizer 1320 may determine at least one other extended word by applying the acquired extended word to the data recognition model. For example, the data recognizer 1320 may acquire a certain number of extended words according to an order of a higher use probability of the user or an order of a higher weight by applying the acquired extended word to the data recognition model.

The data recognizer 1320 may acquire information regarding whether to display a space, by applying the acquired extended word to the data recognition model. For example, the data recognizer 1320 may acquire information regarding whether to display a space, according to determination of whether a probability or weight that a space is located next to a specific extended word is greater than or equal to or less than or equal to a certain criterion, by applying the acquired extended word to the data recognition model.

The data recognizer 1320 may acquire information regarding whether to display a space, by applying the acquired extended word to the data recognition model, and when the information indicates that a space is displayed, the data recognizer 1320 may acquire at least one pseudo-morpheme or extended word to be located next to the space. In this case, the data recognizer 1320 may acquire a certain number of pseudo-morphemes or extended words according to an order of a higher use probability of the user or an order of a higher weight.

At least one part of the data learning unit 1310 and at least one part of the data recognizer 1320 may be manufactured in a form of at least one hardware chip and equipped in an electronic device. For example, at least one of the data learning unit 1310 and the data recognizer 1320 may be manufactured in a form of exclusive hardware chip for an artificial intelligence (AI), or manufactured as a part of an existing general-use processor (e.g., a central processing unit (CPU) or an application processor) or a graphic exclusive processor (e.g., a graphic processing unit (GPU)) and may be equipped in various types of electronic devices described above. In this case, the exclusive hardware chip for an AI is an exclusive processor specified to probability computation and may quickly process a computation operation of an AI field, such as machine learning, since the exclusive hardware chip has a higher parallel processing performance than the existing general-use processors.

The data learning unit 1310 and the data recognizer 1320 may be equipped in one electronic device or respectively equipped in individual electronic devices. For example, one of the data learning unit 1310 and the data recognizer 1320 may be included in a device 1000, and the other one may be included in a server. In addition, in a wired or wireless manner between the data learning unit 1310 and the data recognizer 1320, model information constructed by the data learning unit 1310 may be provided to the data recognizer 1320, and data input to the data recognizer 1320 may be provided as additional learning data to the data learning unit 1310.

At least one part of the data learning unit 1310 and at least one part of the data recognizer 1320 may be implemented as a software module. When at least one of the data learning unit 1310 and the data recognizer 1320 is implemented as a software module (or a program module including instructions), the software module may be stored in a non-transitory computer-readable recording medium. In addition, in this case, at least one software module may be provided by an operating system (OS) or a certain application. A part of the at least one software module may be provided by the OS, and the other part may be provided by the certain application.

Figure 17:
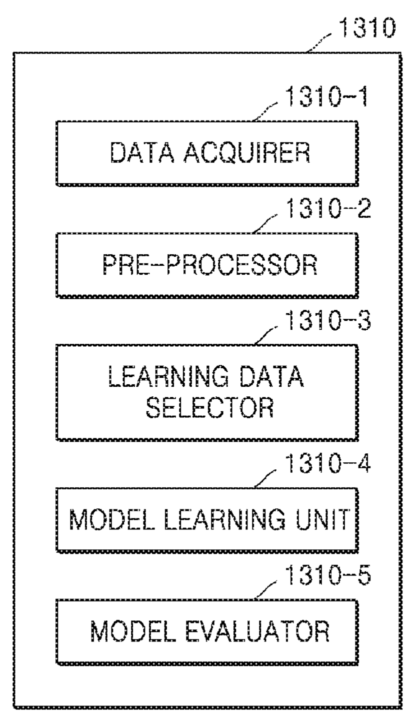
FIG. 17 is a block diagram illustrating an example data learning unit according to various example embodiments.

FIG. 17 is a block diagram illustrating an example data learning unit 1310 according to various example embodiments.

Referring to FIG. 17, the data learning unit 1310 according to various example embodiments may include a data acquirer (e.g., including processing circuitry and/or program elements) 1310-1, a pre-processor (e.g., including processing circuitry and/or program elements) 1310-2, a learning data selector (e.g., including processing circuitry and/or program elements) 1310-3, a model learning unit (e.g., including processing circuitry and/or program elements) 1310-4, and a model evaluator (e.g., including processing circuitry and/or program elements) 1310-5. According to various embodiments, the data learning unit 1310 may necessarily include the data acquirer 1310-1 and the model learning unit 1310-4 and selectively further include at least one of the pre-processor 1310-2, the learning data selector 1310-3, and the model evaluator 1310-5.

The data acquirer 1310-1 may acquire learning data required to determine recommended words for a character input by the user. The data acquirer 1310-1 may acquire learning data required for learning to determine pseudo-morphemes to be recommended and extended words to be recommended and determine whether a space is displayed next to a recommended extended word.

The data acquirer 1310-1 may acquire, for example, a certain user speech and certain context information. In addition, the data acquirer 1310-1 may acquire information regarding a pseudo-morpheme or extended word selected by the user from among at least one pseudo-morpheme or extended word recommended by the device 1000.

The pre-processor 1310-2 may pre-process the acquired data so such that the acquired data is used to determine pseudo-morphemes to be recommended and extended words to be recommended and determine whether a space is displayed next to a recommended extended word. The pre-processor 1310-2 may process the acquired data in a preset format such that the model learning unit 1310-4 to be described below uses the acquired data for learning to determine an intention of the user, provide relevant information, and recommend a substitutional operation.

The learning data selector 1310-3 may select learning data required for learning from among the pre-processed data. The selected data may be provided to the model learning unit 1310-4. The learning data selector 1310-3 may select learning data required for learning from among the pre-processed data according to a preset criterion for determining pseudo-morphemes to be recommended and extended words to be recommended and determining whether a space is displayed next to a recommended extended word. The learning data selector 1310-3 may select learning data according to a criterion preset by learning in the model learning unit 1310-4 to be described below.

The model learning unit 1310-4 may learn, based on learning data selected by the learning data selector 1310-3 or acquired by the data acquirer 1310-1, a criterion for determining pseudo-morphemes to be recommended and extended words to be recommended and determining whether a space is displayed next to a recommended extended word. In addition, the model learning unit 1310-4 may learn a criterion of which learning data is to be used to determine pseudo-morphemes to be recommended and extended words to be recommended and determine whether a space is displayed next to a recommended extended word.

In addition, the model learning unit 1310-4 may allow a data recognition model, which is to be used to determine pseudo-morphemes to be recommended and extended word to be recommended and determine whether a space is displayed next to a recommended extended word, to learn by using learning data. In this case, the data recognition model may be a pre-constructed model. For example, the data recognition model may be a model pre-constructed by receiving basic learning data (e.g., sample data).

The data recognition model may be constructed by considering an application filed of the data recognition model, a purpose of learning, a computing performance of a device, or the like. The data recognition model may be designed so as to simulate a brain structure of a human being in a computer system. The data recognition model may include a plurality of network nodes having weights, which simulate neurons in a neural network of the human being. The plurality of network nodes may form each connection relationship so as to simulate a synaptic activity of a neuron which gives and takes a signal through a synapse. The data recognition model may include, for example, a neural network model or a deep learning model developed from the neural network model. In the deep learning model, the plurality of network nodes may be located at different depths (or layers) to give and take data according to a convolution connection relationship. For example, a model such as a DNN, an RNN, or a bidirectional recurrent deep neural network (BRDNN) may be used as the data recognition model, but is not limited thereto.

According to various example embodiments, when there exist a plurality of pre-constructed data recognition models, the model learning unit 1310-4 may determine, as a data recognition model to be learned, a data recognition model having a high relation of basic learning data with input learning data. In this case, the basic learning data may be pre-classified for each data type, and the data recognition models may be pre-classified for each data type. For example, the basic learning data may be pre-classified based on various criteria such as a generation region of learning data, a generation time of the learning data, a size of the learning data, a genre of the learning data, a generator of the learning data, and a type of an object in the learning data.

The model learning unit 1310-4 may allow the data recognition model to learn by using, for example, a learning algorithm including error back-propagation or gradient descent.

The model learning unit 1310-4 may allow the data recognition model to learn through, for example, supervised learning using at least one part of learning data as a criterion. The model learning unit 1310-4 may allow the data recognition model to learn through, for example, unsupervised learning by which a criterion for determining an intention of the user, providing relevant information, and recommending a substitutional operation is discovered by learning using the learning data, by the model learning unit 1310-4, a type of data required to determine an intention of the user, provide relevant information, and recommend a substitutional operation without a separate supervision. For example, the model learning unit 1310-4 may allow the data recognition model to learn by considering a use frequency of the user for an extended word or pseudo-morpheme. The model learning unit 1310-4 may allow the data recognition model to learn by using feedback information that is information regarding an extended word or pseudo-morpheme selected by the user. The model learning unit 1310-4 may allow the data recognition model to learn through, for example, reinforcement learning using a feedback on whether a result of determining an intention of the user, providing relevant information, and recommending a substitutional operation according to learning is right.

In addition, when the data recognition model is learned, the model learning unit 1310-4 may store the learned data recognition model. In this case, the model learning unit 1310-4 may store the learned data recognition model in a memory of an electronic device (e.g., the device 1000) including the data recognizer 1320. The model learning unit 1310-4 may store the learned data recognition model in a memory of a server connected to an electronic device (e.g., the device 1000) through a wired or wireless network.

For example, a memory in which the learned data recognition model is stored may also store, for example, a command or data related to at least one other component of an electronic device. In addition, the memory may store software and/or programs. The programs may include, for example, a kernel, middleware, an application programming interface (API) and/or application programs (or "applications").

The model evaluator 1310-5 may input evaluation data to the data recognition model, and if a recognition result output from the data recognition model does not satisfy a certain criteria, the model evaluator 1310-5 may allow the model learning unit 1310-4 to perform learning again. In this case, the evaluation data may be preset data for evaluating the data recognition model.

For example, when a number or percentage of pieces of evaluation data of which a recognition result is not correct among recognition results of the learned data recognition model for the evaluation data exceeds a preset threshold, the model evaluator 1310-5 may evaluate that the certain criteria is not satisfied. For example, when the certain criteria is defined as 2%, if the learned data recognition model outputs wrong recognition results for more than 20 pieces of evaluation data among a total of 1000 pieces of evaluation data, the model evaluator 1310-5 may evaluate that the learned data recognition model is not suitable.

When there exist a plurality of learned data recognition models, the model evaluator 1310-5 may evaluate whether each learned data recognition model satisfies the certain criteria and determine a model satisfying the certain criteria as a final data recognition model. In this case, when a plurality of models satisfy the certain criteria, the model evaluator 1310-5 may determine, as the final data recognition model, any one model or a certain number of models preset in an order of higher evaluation score.

At least one of the data acquirer 1310-1, the pre-processor 1310-2, the learning data selector 1310-3, the model learning unit 1310-4, and the model evaluator 1310-5 in the data learning unit 1310 may be manufactured in a form of at least one hardware chip and equipped in an electronic device. For example, at least one of the data acquirer 1310-1, the pre-processor 1310-2, the learning data selector 1310-3, the model learning unit 1310-4, and the model evaluator 1310-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1310-1, the pre-processor 1310-2, the learning data selector 1310-3, the model learning unit 1310-4, and the model evaluator 1310-5 may be equipped in one electronic device or respectively equipped in individual electronic devices. For example, some of the data acquirer 1310-1, the pre-processor 1310-2, the learning data selector 1310-3, the model learning unit 1310-4, and the model evaluator 1310-5 may be included in the device 1000, and the other some may be included in a server.

At least one of the data acquirer 1310-1, the pre-processor 1310-2, the learning data selector 1310-3, the model learning unit 1310-4, and the model evaluator 1310-5 may be implemented as a software module. When at least one of the data acquirer 1310-1, the pre-processor 1310-2, the learning data selector 1310-3, the model learning unit 1310-4, and the model evaluator 1310-5 is implemented as a software module (or a program module including instructions), the software module may be stored in a non-transitory computer-readable recording medium. In addition, in this case, at least one software module may be provided by an OS or a certain application. A part of the at least one software module may be provided by the OS, and the other part may be provided by the certain application.

The processor 1300 may use various data recognition models, and efficiently learn a criterion for determining an intention of the user, providing relevant information, and recommending a substitutional operation, by various methods through the data recognition models.

Figure 18:
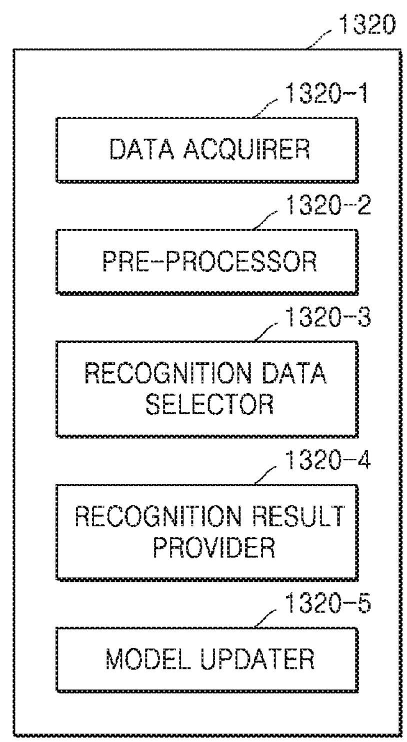
FIG. 18 is a block diagram illustrating an example data recognizer according to various example embodiments.

FIG. 18 is a block diagram illustrating an example of the data recognizer 1320 according to various example embodiments.

Referring to FIG. 18, the data recognizer 1320 according to some embodiments may include a data acquirer (e.g., including processing circuitry and/or program elements) 1320-1, a pre-processor (e.g., including processing circuitry and/or program elements) 1320-2, a recognition data selector (e.g., including processing circuitry and/or program elements) 1320-3, a recognition result provider (e.g., including processing circuitry and/or program elements) 1320-4, and a model updater (e.g., including processing circuitry and/or program elements) 1320-5. According to various embodiments, the data recognizer 1320 may necessarily include the data acquirer 1320-1 and the recognition result provider 1320-4 and selectively further include at least one of the pre-processor 1320-2, the recognition data selector 1320-3, and the model updater 1320-5.

The data acquirer 1320-1 may acquire data required to determine pseudo-morphemes to be recommended and extended words to be recommended and determine whether to display a space. For example, the data acquirer 1320-1 may acquire, as recognition data, a character, a pseudo-morpheme, or an extended word input by the user. The data acquirer 1320-1 may acquire a character, a pseudo-morpheme, or an extended word selected by the user. The pre-processor 1320-2 may pre-process the acquired recognition data such that the recognition data required to determine pseudo-morphemes to be recommended and extended words to be recommended and determine whether to display a space is used. The pre-processor 1320-2 may process the acquired data in a preset format such that the recognition result provider 1320-4 to be described below uses the data acquired to determine pseudo-morphemes to be recommended and extended words to be recommended and determine whether to display a space. For example, the data acquirer 1320-1 may acquire a character input to the device 1000. In addition, the data acquirer 1320-1 may acquire context information related to the user or the device 1000. In addition, for example, the context information may be information generated by the device 1000 or information received from an external device.

The recognition data selector 1320-3 may select, from among the pre-processed recognition data, recognition data required to determine pseudo-morphemes to be recommended and extended words to be recommended and determine whether to display a space. The selected recognition data may be provided to the recognition result provider 1320-4. The recognition data selector 1320-3 may select a part or all of the pre-processed recognition data according to a preset criterion for determining pseudo-morphemes to be recommended and extended words to be recommended and determining whether to display a space. The recognition data selector 1320-3 may select recognition data according to a criterion preset by learning in the model learning unit 1310-4 described above. The recognition result provider 1320-4 may determine pseudo-morphemes to be recommended and extended words to be recommended and determine whether to display a space, by applying the selected recognition data to a data recognition model. The recognition result provider 1320-4 may provide a recognition result according to a recognition purpose. The recognition result provider 1320-4 may apply the recognition data, selected by the recognition data selector 1320-3 or acquired by the data acquirer 1320-1, to the data recognition model The recognition result provider 1320-4 may acquire information regarding whether to display at least one pseudo-morpheme, at least one extended word, or a space, as an application result of the data recognition model.

The model updater 1320-5 may update the data recognition model based on an evaluation on the recognition result provided by the recognition result provider 1320-4. For example, the model updater 1320-5 may allow the model learning unit 1310-4 to update the data recognition model. For example, the evaluation on the recognition result may be user feedback information according to whether to display a pseudo-morpheme, at least one extended word, or a space recommended by the device 1000 to the user. For example, a pseudo-morpheme or extended word selected by the user from among the at least one pseudo-morpheme or the at least one extended word recommended by the device 1000 is user feedback information and may be used as learning data for updating the data recognition model. When the device 1000 displays a space, a user input for accepting the space and inputting a next character or for deleting the space is user feedback information and may be used as learning data for updating the data recognition model. When the device 1000 does not display a space, a user input for inputting a space is user feedback information and may be used as learning data for updating the data recognition model.

At least one of the data acquirer 1320-1, the pre-processor 1320-2, the recognition data selector 1320-3, the recognition result provider 1320-4, and the model updater 1320-5 in the data recognizer 1320 may be manufactured in a form of at least one hardware chip and equipped in an electronic device. For example, at least one of the data acquirer 1320-1, the pre-processor 1320-2, the recognition data selector 1320-3, the recognition result provider 1320-4, and the model updater 1320-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1320-1, the pre-processor 1320-2, the recognition data selector 1320-3, the recognition result provider 1320-4, and the model updater 1320-5 may be equipped in one electronic device or respectively equipped in individual electronic devices. For example, some of the data acquirer 1320-1, the pre-processor 1320-2, the recognition data selector 1320-3, the recognition result provider 1320-4, and the model updater 1320-5 may be included in the device 1000, and the other some may be included in a server.

At least one of the data acquirer 1320-1, the pre-processor 1320-2, the recognition data selector 1320-3, the recognition result provider 1320-4, and the model updater 1320-5 may be implemented as a software module. When at least one of the data acquirer 1320-1, the pre-processor 1320-2, the recognition data selector 1320-3, the recognition result provider 1320-4, and the model updater 1320-5 is implemented as a software module (or a program module including instructions), the software module may be stored in a non-transitory computer-readable recording medium. In addition, in this case, at least one software module may be provided by an OS or a certain application. A part of the at least one software module may be provided by the OS, and the other part may be provided by the certain application.

In addition, the device 1000 may provide a service answering an intention of the user to the user by using a data recognition model to which a learned result is applied.

Figure 19:
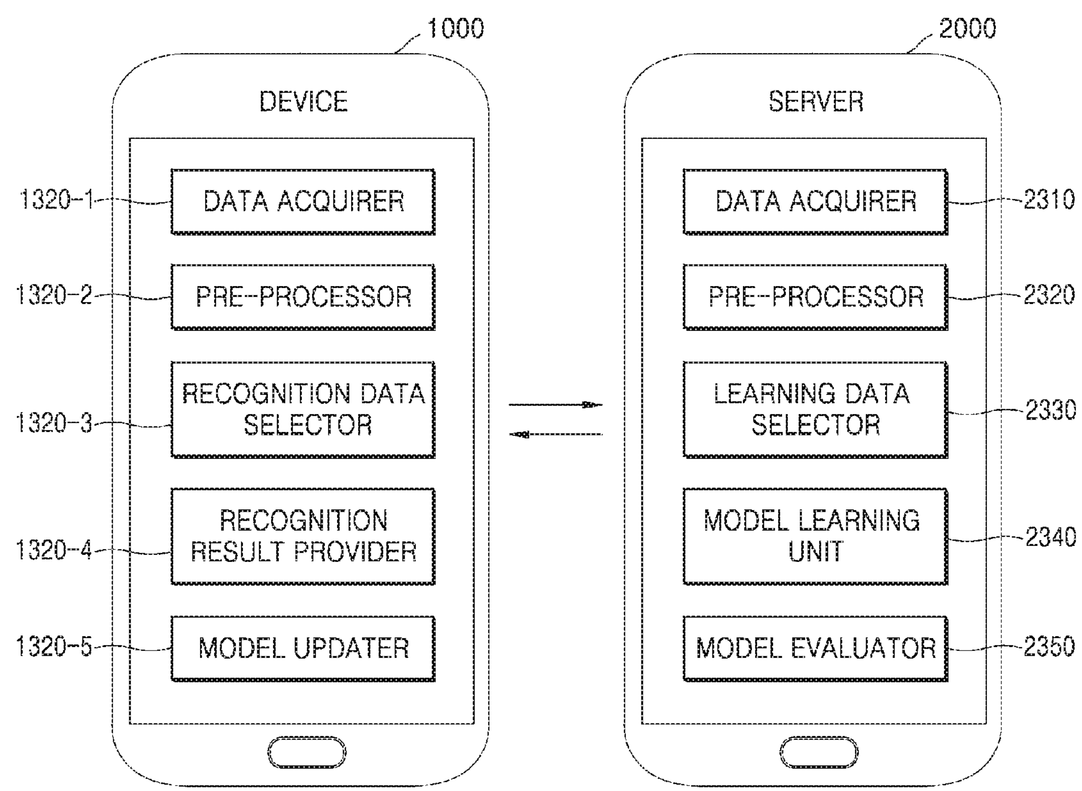
FIG. 19 is a diagram illustrating an example of learning and recognizing data through interoperating between a device and a server, according to various example embodiments.

FIG. 19 is a diagram illustrating an example of learning and recognizing data through interoperating between the device 1000 and the server 2000, according to various example embodiments.

Referring to FIG. 19, the server 2000 may include a data acquirer 2310, a pre-processor 2320, a learning data selector 2330, a model learning unit 2340, and a model evaluator 2350. In addition, according to other example embodiment, some of the data acquirer 2310, the pre-processor 2320, the learning data selector 2330, the model learning unit 2340, and the model evaluator 2350 may be included in the device 100 illustrated in FIG. 18.

Referring to FIG. 19, the server 2000 may learn a criterion for determining recommended words for a character input from the user, and the device 1000 may determine recommended words for a character input from the user, based on a result of the learning by the server 2000.

In this case, a model learning unit 2340 may perform the functions of the model learning unit 1310 illustrated in FIG. 17. The model learning unit 2340 of the server 2000 may learn a criterion for which data is to be used to determine pseudo-morphemes to be recommended and extended words to be recommended and determine whether to display a space. In addition, the model learning unit 2340 of the server 2000 may learn a criterion for how to determine pseudo-morphemes to be recommended and extended words to be recommended and determine whether to display a space, by using data. The model learning unit 2340 may acquire data to be used for the learning, and learn a criterion for determining pseudo-morphemes to be recommended and extended words to be recommended and determining whether to display a space, by applying the acquired data to a data recognition model to be described below.

In addition, the recognition result provider 1320-4 of the device 1000 may determine pseudo-morphemes to be recommended and extended words to be recommended and determine whether to display a space, by applying data selected by the recognition data selector 1320-3 to a data recognition model generated by the server 2000. For example, the recognition result provider 1320-4 may transmit the data selected by the recognition data selector 1320-3 to the server 2000 and request the server 2000 to determine pseudo-morphemes to be recommended and extended words to be recommended and determine whether to display a space by applying the data selected by the recognition data selector 1320-3 to the data recognition model. In addition, the recognition result provider 1320-4 may receive, from the server 2000, information about determination of pseudo-morphemes to be recommended and extended words to be recommended and determination of whether to display a space.

The recognition result provider 1320-4 of the device 1000 may receive the data recognition model generated by the server 2000 from the server 2000, and determine pseudo-morphemes to be recommended and extended words to be recommended and determine whether to display a space by using the received data recognition model. In this case, the recognition result provider 1320-4 of the device 1000 may determine pseudo-morphemes to be recommended and extended words to be recommended and determine whether to display a space by applying the data selected by the recognition data selector 1320-3 to the data recognition model received from the server 2000.

In addition, the device 1000 and the server 2000 may effectively distribute and perform tasks for the learning of the data recognition model and the recognition of the data, and through this, the device 1000 and the server 2000 may efficiently process data to provide a service in accordance with an intention of the user and effectively protect privacy of the user.

Figure 20:
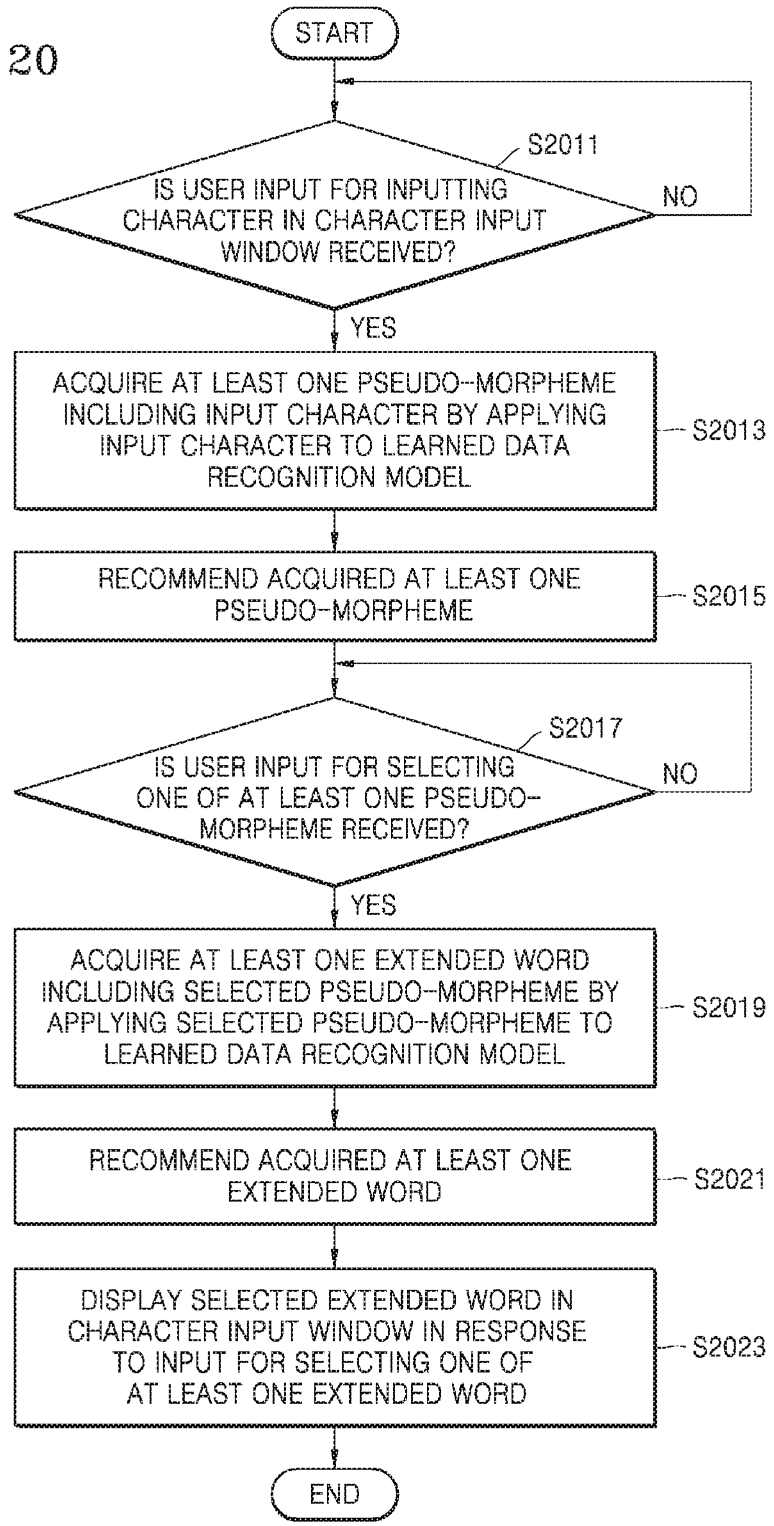
FIG. 20 is a flowchart illustrating an example of a device using a data recognition model, according to various example embodiments.

FIG. 20 is a flowchart illustrating an example data recognition model, according to various example embodiments.

The device 1000 may determine whether a user input for inputting a character in a character input window is received (S2011).

When the user input is received (S2011-Y), the device 1000 may acquire at least one pseudo-morpheme including the input character by applying the input character to a learned data recognition model (S2013). For example, the device 1000 may acquire at least one pseudo-morpheme by applying the input character to a learned data recognition model stored in the memory 1700 of the device 1000. The memory 1700 may include a memory prepared inside the device 1000, a memory card inserted into the device 1000, or the like. In addition, the data recognition model may be a model learned by using at least one of information about character or speech data input by the user in the past, statistical data about a general use frequency of each pseudo-morpheme, and information about a pseudo-morpheme selected by the user from among at least one pseudo-morpheme recommended by the device 1000.

The device 1000 may recommend the acquired at least one pseudo-morpheme to the user (S2015). For Example, the device 1000 may display the acquired at least one pseudo-morpheme. In this case, the device 1000 may display only a portion of the acquired at least one pseudo-morpheme by considering priority of each of the pseudo-morphemes.

The device 1000 may determine whether a user input for selecting one of the at least one pseudo-morpheme is received (S2017).

When the user input is received (S2017-Y), the device 1000 may acquire at least one extended word including the selected pseudo-morpheme by applying the selected pseudo-morpheme to the learned data recognition model (S2019). For example, the device 1000 may acquire at least one extended word by applying the at least one pseudo-morpheme to a learned data recognition model stored in the memory 1700 of the device 1000. The memory 1700 may include a memory prepared inside the device 1000, a memory card inserted into the device 1000, or the like. In addition, the data recognition model may be a model learned by using at least one of information about character or speech data input by the user in the past, statistical data about a general use frequency of each extended word, and information about a pseudo-extended word selected by the user from among at least one extended word recommended by the device 1000.

The device 1000 may recommend the acquired at least one extended word to the user (S2021). For Example, the device 1000 may display the acquired at least one extended word. In this case, the device 1000 may display only a portion of the acquired at least one extended word by considering priority of each of the extended words.

The device 1000 may display the selected extended word in the character input window in response to an input for selecting one of the at least one extended word (S2023).

In FIG. 20, the data recognition models for providing a pseudo-morpheme and an extended word may be the same or different from each other.

In addition, although an embodiment in which the device 1000 acquires both a pseudo-morpheme and an extended word to be recommended to the user using the learned data recognition models has been described with reference to FIG. 20, the device 1000 may selectively use only one of the learned data recognition model configured to provide a pseudo-morpheme and the learned data recognition model configured to provide an extended word, according to various modified embodiments.

Figure 21:
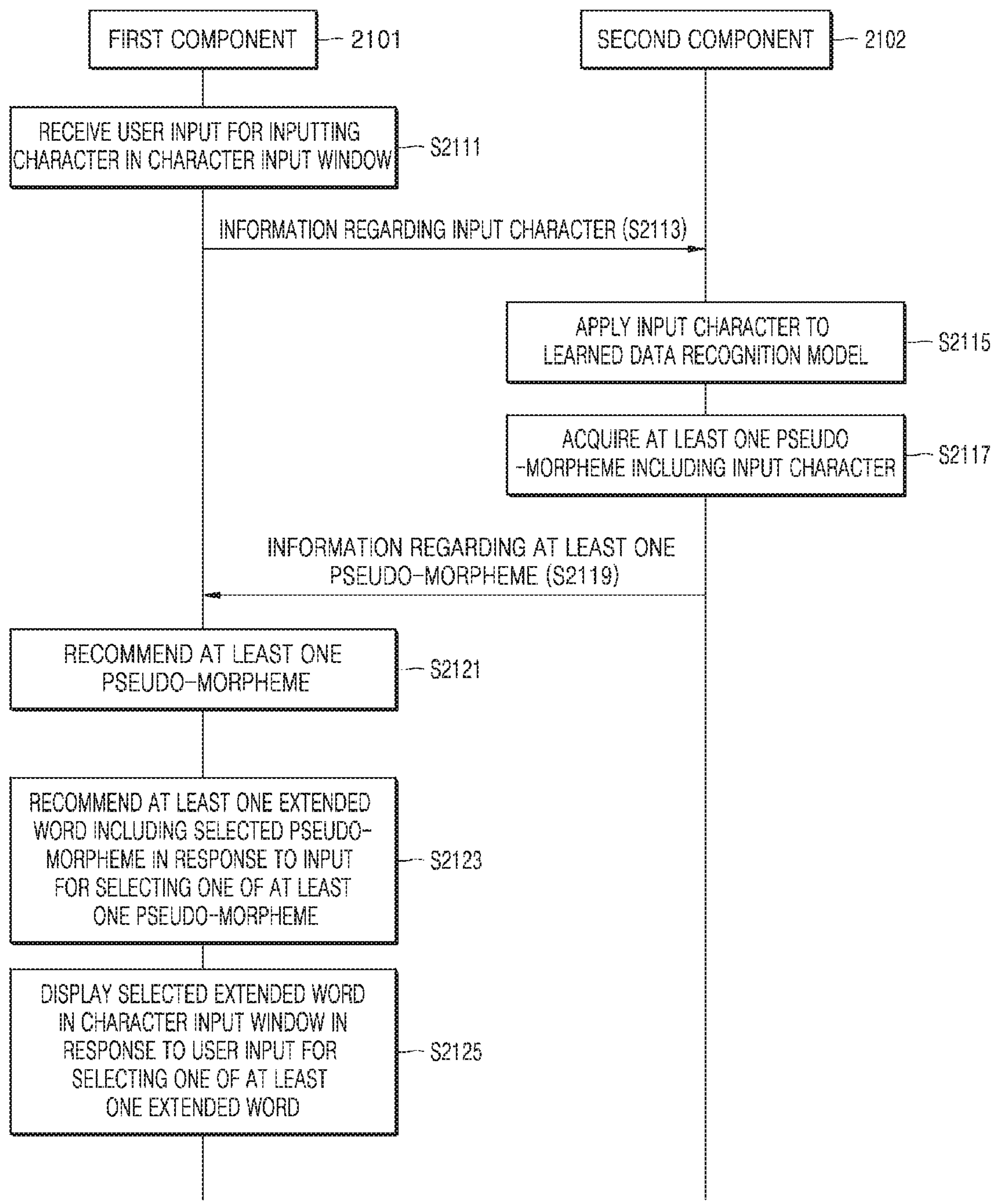
FIGS. 21, 22 and 23 are flowcharts illustrating examples of a network system using a data analysis model, according to various example embodiments.
Figure 22:
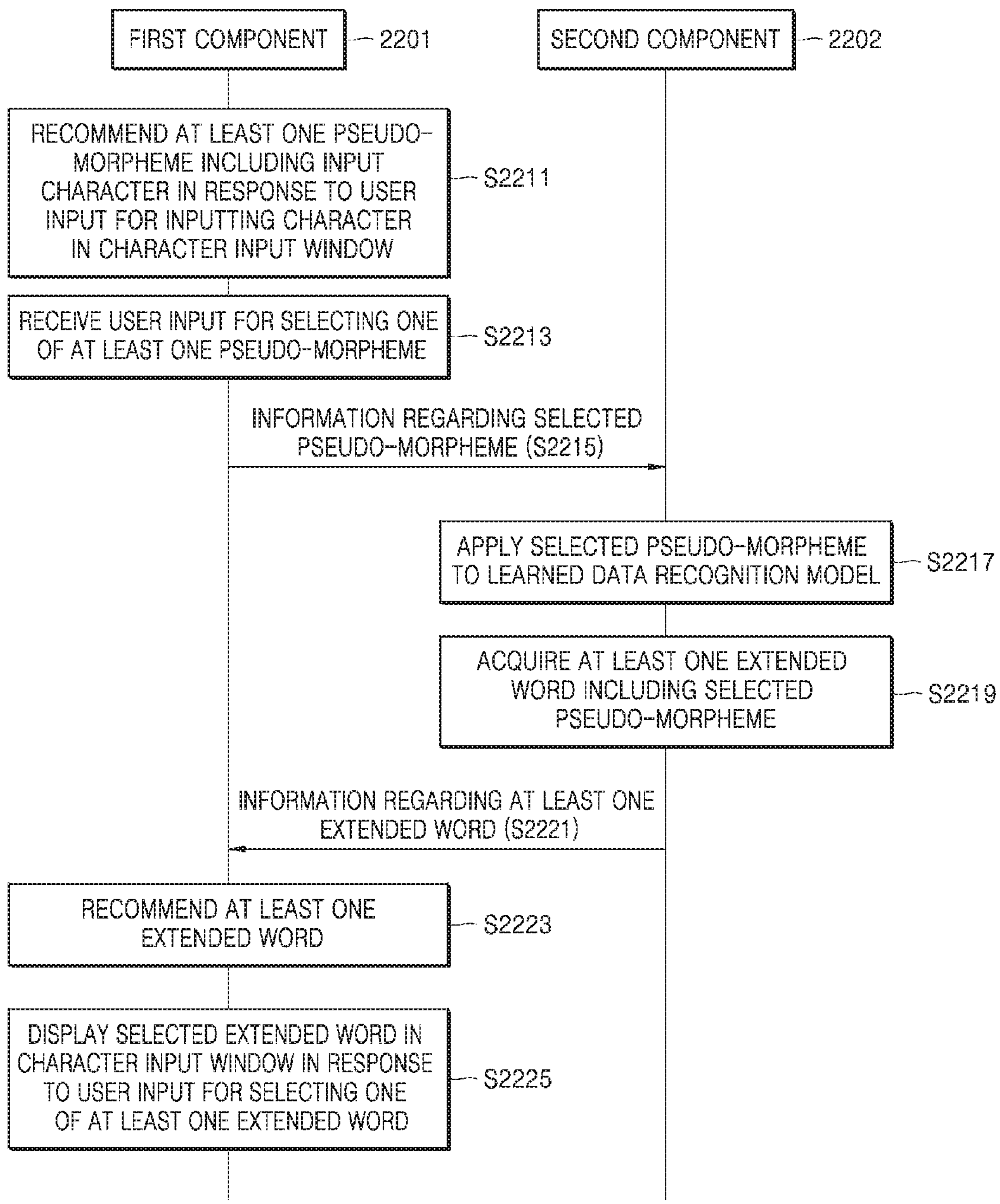
Figure 23:
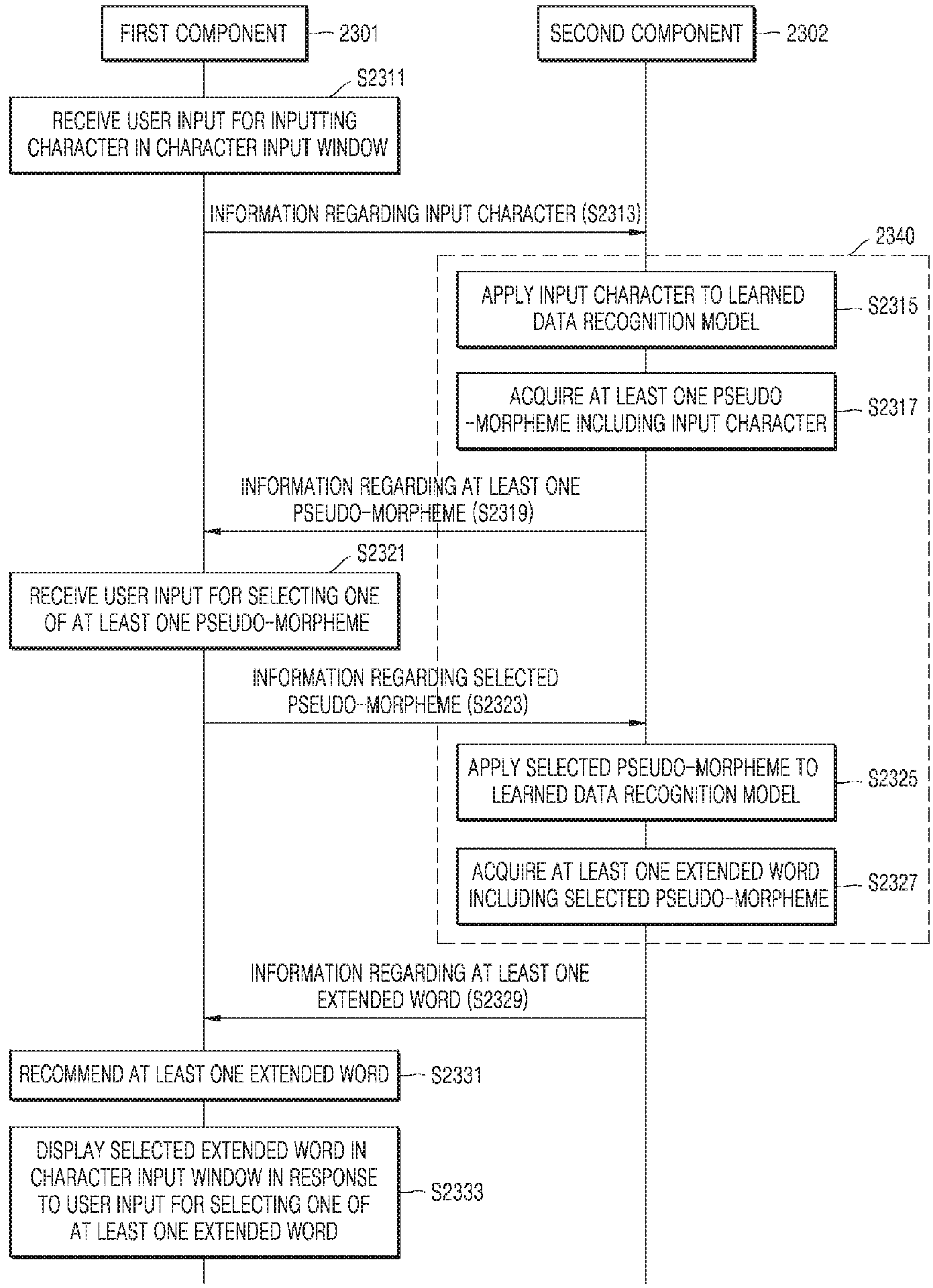

FIGS. 21, 22 and 23 are flowcharts illustrating an example network system using a data analysis model, according to various example embodiments.

In FIGS. 21, 22 and 23, the network system may include a first component 2101, 2201, or 2301 and a second component 2102, 2202, or 2302. Herein, the first component 2101, 2201, or 2301 may, for example, be the device 1000, and the second component 2102, 2202, or 2302 may, for example, be the server 2000 in which a data analysis model is stored. The first component 2101, 2201, or 2301 may be a general-use processor, and the second component 2102, 2202, or 2302 may be an artificial intelligence exclusive processor. The first component 2101, 2201, or 2301 may be at least one application, and the second component 2102, 2202, or 2302 may be an operating system (OS). For example, the second component 2102, 2202, or 2302 is a more integrated or exclusive component or a component having less delay, better performance, or more resources than the first component 2101, 2201, or 2301, and thus the second component 2102, 2202, or 2302 may process a lot of computations, which are required to generate, update, or apply a data recognition model, more quickly and effectively than the first component 2101, 2201, or 2301.

In this case, an interface for transmitting/receiving data between the first component 2101, 2201, or 2301 and the second component 2102, 2202, or 2302 may be defined.

For example, an application program interface (API) having learning data to be applied to the data recognition model as a factor value (or a mediation value or a transfer value) may be defined. The API may be referred to, for example, as a set of sub-routines or functions which can be called by any one protocol (for example, a protocol defined in the device 1000) to perform certain processing of another protocol (for example, a protocol defined in the server 2000). That is, an environment in which an operation of another protocol can be performed in any one protocol may be provided.

The first component 2101 may receive a user input for inputting a character in a character input window (S2111).

The first component 2101 may transmit information about the input character to the second component 2102 (S2113). For example, the first component 2101 may apply the input character as a factor value for an API function provided for the use of a data recognition model. In this case, the API function may transmit the input character to the second component 2102 as recognition data to be applied to the data recognition model. Herein, the information about the input character may include communication data obtained by changing or supplementing the character according to a communication format.

The second component 2102 may apply the input character to a learned data recognition model (S2115). As an application result, the second component 2102 may acquire at least one pseudo-morpheme including the input character (S2117). Thereafter, the second component 2102 may transmit information about the acquired at least one pseudo-morpheme to the first component 2101 (S2119). Herein, information about a pseudo-morpheme may include communication data obtained by changing or supplementing the pseudo-morpheme according to a communication format.

The first component 2101 may recommend the received at least one pseudo-morpheme to the user (S2121). For example, the first component 2101 may display the received at least one pseudo-morpheme.

The first component 2101 may recommend at least one extended word including a selected pseudo-morpheme in response to an input for selecting one of the recommended at least one pseudo-morpheme (S2123).

The first component 2101 may display a selected extended word in the character input window in response to a user input for selecting one of the at least one extended word (S2125).

According to another example embodiment, referring to FIG. 22, the first component 2201 may recommend at least one pseudo-morpheme including an input character in response to a user input for inputting a character in a character input window (S2211). For example, the first component 2201 may analyze the input character to display at least one pseudo-morpheme to be recommended.

The first component 2201 may receive a user input for selecting one of the recommended at least one pseudo-morpheme (S2213).

The first component 2201 may transmit information about the selected pseudo-morpheme to the second component 2202 (S2215). For example, the first component 2201 may apply the selected pseudo-morpheme as a factor value for an API function provided for the use of a data recognition model. In this case, the API function may transmit the selected pseudo-morpheme to the second component 2202 as recognition data to be applied to the data recognition model. Herein, the information about the selected pseudo-morpheme may include communication data obtained by changing or supplementing the pseudo-morpheme according to a communication format.

The second component 2202 may apply the selected pseudo-morpheme to a learned data recognition model (S2217). As an application result, the second component 2202 may acquire at least one extended word including the selected pseudo-morpheme (S2219). Thereafter, the second component 2202 may transmit information about the acquired at least one extended word to the first component 2201 (S2221). Herein, the information about an extended word may include communication data obtained by changing or supplementing the extended word according to a communication format.

The first component 2201 may recommend the received at least one extended word to the user (S2223). For example, the first component 2201 may display the received at least one extended word.

The first component 2201 may display a selected extended word in the character input window in response to a user input for selecting one of the at least one extended word (S2225).

According to another example embodiment, referring to FIG. 23, the first component 2301 may receive a user input for inputting a character in a character input window (S2311). The first component 2301 may transmit information about the input character to the second component 2302 (S2313).

The second component 2302 may apply the input character to a learned data recognition model and acquire at least one pseudo-morpheme including the input character (S2315, S2317).

The second component 2302 may transmit information about the acquired at least one pseudo-morpheme to the first component 2301 (S2319).

The first component 2301 may receive a user input for selecting one of the received at least one pseudo-morpheme (S2321).

The first component 2301 may transmit information about the selected pseudo-morpheme to the second component 2302 (S2323).

The second component 2302 may apply the selected pseudo-morpheme to a learned data recognition model and acquire at least one extended word including the selected pseudo-morpheme (S2325, S2327).

The second component 2302 may transmit information about the acquired at least one extended word to the first component 2301 (S2329).

The first component 2301 may recommend the received at least one extended word to the user (S2331). Thereafter, the first component 2301 may display a selected extended word in the character input window in response to a user input for selecting one of the at least one extended word (S2333).

According to various embodiments, in FIG. 23, the data recognition model configured to provide at least one pseudo-morpheme including an input character and the data recognition model configured to provide at least one extended word including a selected pseudo-morpheme may be implemented as one data recognition model.

For example, the operations (S2315, S2317, S2325, and S2327) included in operation 2340 in FIG. 23 may be performed by one data recognition model.

For example, referring to FIG. 23, the second component 2302 may receive information about the input character (S2313). In this case, the second component 2302 may acquire at least one extended word including the input character by applying the information about the input character to a learned data recognition model.

For example, when a user input for inputting "ha" in a word input window is received, the first component 2301 may transmit the characters "ha" to the second component 2302. The second component 2302 may acquire at least one extended word such as "happiness", "happily", and "happy" by applying the characters "ha" to the learned data recognition model. When the second component 2302 transmits information about the acquired at least one extended word to the first component 2301, the first component 2301 may recommend at least one extended word related to the input character.

Various example embodiments may be implemented in a form of a recording medium including computer-executable instructions such as a program module executed by a computer system. A non-transitory computer-readable medium may be an arbitrary available medium which may be accessed by a computer system and includes all types of volatile and nonvolatile media and separated and non-separated media. In addition, the non-transitory computer-readable medium may include all types of computer storage media and communication media. The computer storage media include all types of volatile and nonvolatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media.

In addition, the method according to the disclosed embodiments may be provided as a computer program product.

The computer program product may include a software (S/W) program, a non-transitory computer readable storage medium in which a S/W program is stored, or a product traded between a seller and a purchaser.

For example, the computer program product may include a product of a S/W program type (for example, a downloadable application) which is electronically distributed through the device 1000, a manufacturer of the device 1000, or an electronic market (for example, Google Play Store or App Store). For the electronic distribution, at least a portion of a S/W program may be stored in a storage medium or temporarily generated. In this case, the storage medium may be a server in the manufacturer or the electronic market or a storage medium in a relay server.

In addition, in the present disclosure, "unit, interface, or -er(or)" may refer, for example, to a hardware component such as a processor or a circuit and/or a software component executed by a hardware component such as a processor.

The various example embodiments described above are merely illustrative, and it will be understood by those of ordinary skill in the art that various changes in form and details may be made therein without changing the technical spirit and scope of the present disclosure. Therefore, the example embodiments should be understood in the illustrative sense only and not for the purpose of limitation in all aspects. For example, each component described as a single type may be carried out by being distributed, and likewise, components described as a distributed type may also be carried out by being coupled.

It should be understood that embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims and their equivalents.

What is claimed is:

1. A device comprising:

a memory configured to store at least one program;

an input interface comprising input circuitry configured to receive an input for inputting at least one character in a character input window; and at least one processor configured to provide recommended words for at least one input character by executing the at least one program, wherein the at least one program comprises at least one instruction configured to, when executed by the processor, cause the device to:

recommend at least one word including the at least one input character by analyzing the input at least one character;

in response to receiving a user input for selecting a word from the recommended at least one word and collecting, based on information about speech data input by a user, a characteristic of the user for inputting characters, recommend a plurality of extended words including the selected word and at least one additional character; and display a selected extended word in the character input window in response to receiving a user input for selecting one of the plurality of extended words, wherein the at least one additional character is derived from the selected word.

2. The device of claim 1, wherein the recommending of the at least one word comprises recommending at least one word based on an analysis of the at least one input character and a use frequency with respect to each of the at least one word.

3. The device of claim 1, wherein the recommending of the plurality of extended words comprises recommending the plurality of extended words including the selected word and the at least one additional character based on a characteristic for inputting characters.

4. The device of claim 1, wherein the recommending of the plurality of extended words further comprises recommending at least one other extended word including the selected extended word in response to receiving an input for selecting one of the recommended plurality of extended words, and the displaying of the selected extended word in the character input window comprises displaying a selected other extended word in the character input window in response to receiving the input for selecting one of the recommended plurality of extended words.

5. The device of claim 4, wherein the displaying of the selected extended word further comprises:

predicting whether a space is located next to the selected extended word; and recommending the other extended word including the selected extended word and other extended words not including the selected extended word, based on the predicting.

6. The device of claim 5, wherein the other extended words not including the selected extended word are determined based on at least one extended word pre-displayed in the character input window, the selected extended word, and the space.

7. The device of claim 1, wherein the recommending of the at least one word further comprises:

predicting a type of an extended word to be located next, based on a type and order of at least one extended word pre-displayed in the character input window; and recommending the at least one word including the at least one input character, based on the predicting.

8. The device of claim 1, wherein the recommending of the at least one word further comprises:

displaying the at least one word outside the character input window; and selectively displaying at least one word to indicate whether extended words to be recommended for each of the at least one word exist.

9. The device of claim 1, wherein the recommending of the at least one word further comprises recommending the at least one word by applying the at least one input character to a learned data recognition model, and the learned data recognition model is configured to learn using at least one of: information regarding characters or pieces of speech data input in the past, statistical data regarding a common use frequency for each word, or information regarding a word selected from among the at least one word recommended by the device.

10. The device of claim 1, wherein the recommending of the at least one word further comprises:

simultaneously displaying in the character input window the input character and the at least one word outside of the character input window.

11. The device of claim 10, wherein the recommending of the at least one word further comprises:

in response to receiving the user input for selecting the word from the recommended at least one word, simultaneously displaying in the character input window the selected word in the character input window and the plurality of extended words outside of the character input window.

12. A method by which a device provides recommended words for at least one input character, the method comprising:

receiving an input for inputting at least one character in a character input window;

recommending at least one word including the at least one input character by analyzing the at least one input character;

in response to receiving a user input for selecting a word from the recommended at least one word and collecting, based on information about speech data input by a user, a characteristic of the user for inputting characters, recommending a plurality of extended words including the selected word and at least one additional character; and displaying a selected extended word in response to receiving a user input for selecting one of the plurality of extended words, wherein the at least one additional character is derived from the selected word.

13. The method of claim 12, wherein the recommending of the at least one word comprises recommending the at least one word based on an analysis of the at least one input character and a use frequency with respect to each of the at least one word.

14. The method of claim 12, wherein the recommending of the plurality of extended words comprises recommending the plurality of extended words including the selected word based on a characteristic for inputting characters.

15. The method of claim 12, wherein the recommending of the plurality of extended words further comprises recommending at least one other extended word including the selected extended word in response to receiving an input for selecting one of the recommended plurality of extended words, and the displaying of the selected extended word in the character input window comprises displaying a selected other extended word in the character input window in response to receiving the input for selecting one of the recommended plurality of extended words.

16. The method of claim 15, wherein the displaying of the selected extended word further comprises:

predicting whether a space is located next to the selected extended word; and recommending the other extended word including the selected extended word and other extended words not including the selected extended word, based on the predicting.

17. The method of claim 16, wherein the other extended words not including the selected extended word are determined based on at least one extended word pre-displayed in the character input window, the selected extended word, and the space.

18. The method of claim 12, wherein the recommending of the at least one word further comprises:

predicting a type of an extended word to be located next, based on a type and order of at least one extended word pre-displayed in the character input window; and recommending the at least one word including the at least one input character, based on the predicting.

19. The method of claim 12, wherein the recommending of the at least one word further comprises:

displaying the at least one word outside the character input window; and selectively displaying the at least one word to indicate whether extended words to be recommended for each of the at least one word exist.

20. A computer program product comprising a non-transitory computer-readable recording medium having recorded thereon at least one instruction set which when executed causes a device to:

recommend at least one word including an input character based on an input in a character input window by analyzing the input character;

in response to receiving a user input for selecting a word from the recommended at least one word and collecting, based on information about speech data input by a user, a characteristic of the user for inputting characters, recommend a plurality of extended words including the selected word and at least one additional character; and display a selected extended word in the character input window in response to receiving a user input for selecting one of the plurality of extended words, wherein the at least one additional character is derived from the selected word.

* * * * *